United States Patent [19]
Kelly et al.

[11] Patent Number: 5,933,612
[45] Date of Patent: Aug. 3, 1999

[54] DEADLOCK AVOIDANCE IN A SPLIT-BUS COMPUTER SYSTEM

[75] Inventors: James D. Kelly, Aptos; Michael L. Regal, Campbell, both of Calif.

[73] Assignee: Apple Computer, Inc., Cupertino, Calif.

[21] Appl. No.: 08/903,412

[22] Filed: Jul. 30, 1997

Related U.S. Application Data

[63] Continuation of application No. 08/432,622, May 2, 1995, abandoned.

[51] Int. Cl.$^6$ ........................................................ G06F 13/00
[52] U.S. Cl. ................ 395/306; 395/184.01; 395/200.54
[58] Field of Search ........................ 395/184.01, 200.54, 395/726, 308, 306

[56] References Cited

U.S. PATENT DOCUMENTS

| | | | |
|---|---|---|---|
| 5,442,763 | 8/1995 | Bartfai et al. | 395/375 |
| 5,469,435 | 11/1995 | Krein et al. | 370/85.2 |
| 5,473,762 | 12/1995 | Kelly et al. | 395/287 |
| 5,542,056 | 7/1996 | Jaffa et al. | 395/306 |
| 5,544,332 | 8/1996 | Chen | 395/288 |
| 5,546,546 | 8/1996 | Bell et al. | 395/292 |
| 5,592,670 | 1/1997 | Pletcher | 395/670 |
| 5,680,402 | 10/1997 | Olnowich et al. | 370/468 |

*Primary Examiner*—Ayaz R. Sheikh
*Assistant Examiner*—David A. Wiley
*Attorney, Agent, or Firm*—Burns, Doane, Swecker & Mathis, L.L.P.

[57] ABSTRACT

A mechanism is provided for avoiding deadlock in a computer system in which a split-transaction bus is bridged to a single-envelope bus. In one embodiment, transactions begun on said split-transaction bus are monitored. When a combination of transactions would, if a predetermined further transaction were to begin, result in deadlock, this condition is detected. The predetermined further transaction, if it is requested, is refused, thereby avoiding deadlock. In accordance with another embodiment of the invention, the bus bridge detects when a state of the split-transaction bus would, if a protocol of said split-transaction bus were adhered to, result in deadlock. The bus bridge then drives one or more signals on the split-transaction bus in disregard of the protocol of the split-transaction bus, thereby avoiding deadlock. In accordance with still a further embodiment of the invention, transactions accepted within the bus bridge are monitored. When a combination of said transactions would, if a predetermined further transaction were to begin, result in deadlock, this condition is detected. The predetermined further transaction, if it is requested, is refused, thereby avoiding deadlock.

25 Claims, 14 Drawing Sheets

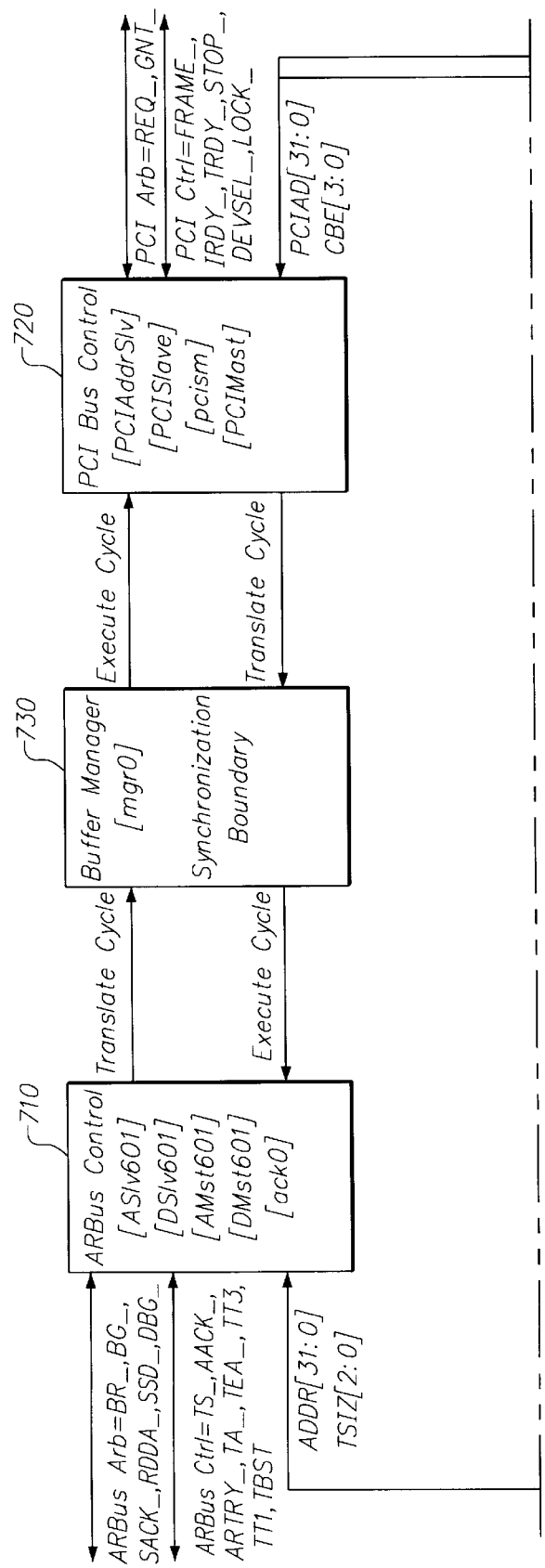

DEADLOCK AVOIDANCE IN A SPLIT-BUS COMPUTER SYSTEM

This application is a continuation of application Ser. No. 08/432,622, filed May 2, 1995 abandoned.

BACKGROUND OF THE INVENTION

1. Field of the Invention

The present invention relates to computer architecture, in particular to deadlock avoidance in a computer system.

2. State of the Art

The PowerPC™ computer architecture, co-developed by Apple Computer, represents a departure from prior-generation small computer architectures. PowerPC machines currently sold by Apple are based largely on the Motorola MPC601 RISC microprocessor. Other related processors, including the MPC 604, MPC 603, MPC 603e, and MPC 602 are currently available and additional related processor including the MPC 620 will be readily available in the future. The MPC60x permits separate address bus tenures and data bus tenures, where tenure is defined as the period of bus mastership. In other words, rather than considering the system bus as an indivisible resource and arbitrating for access to the entire bus, the address and data buses are considered as separate resources, and arbitration for access to these two buses may be performed independently. A transaction, or complete exchange between two bus devices, is minimally comprised of an address tenure; one or more data tenures may also be involved in an exchange. There are two kinds of transactions: address/data and address-only.

A tenure consists of three phases: arbitration, transfer, and termination. During termination, a signal occurs that marks the end of the tenure. The same signal is used to acknowledge the transfer of an address or data beat. A beat corresponds generally to a particular state of the address bus or the data bus. Transfers include both single-beat transfers, in which a single piece of data is transferred, and burst data transfers, in which a burst of four data beats is transferred.

Referring more particularly to FIG. 1, note that the address and data tenures are distinct from one another and that both consist of three phases—arbitration, transfer, and termination. FIG. 1 shows a data transfer that consists of a single-beat transfer (up to 64 bits). In a four-beat burst transfer, by contrast, data termination signals are required for each beat of data, but re-arbitration is not required. Having independent address and data tenures allows address pipelining (indicated in FIG. 1 by the fact that the data tenure begins before the address tenure ends) and split-bus transactions to be implemented at the system level. Address pipelining allows new address bus transactions to begin before the current data bus transaction has finished by overlapping the data bus tenure associated with a previous address bus tenure with one or more successive address tenures. Split-bus transaction capability allows the address bus and data bus to have different masters at the same time.

For clarity, the basic functions of address and data tenures will be discussed in somewhat greater detail.

In the case of address tenure, during address arbitration, address bus arbitration signals are used to gain mastership of the address bus. Assuming the CPU to be the bus master, it then transfers the address on the address bus during the address transfer phase. The address signals, together with certain transfer attribute signals discussed in greater detail hereinafter, control the address transfer. After the address transfer phase, the system uses the address termination phase to signal that the address tenure is complete or that it must be repeated.

In the case of data tenure, during address arbitration, the CPU arbitrates for mastership of the data bus. After the CPU is the bus master, during the data transfer phase, it samples the data bus for read operations or drives the data bus for write operations. Data termination signals occur in the data termination phase. Data termination signals are required after each data beat in a data transfer. In a singlebeat-transaction, the data termination signals also indicates the end of the tenure, while in burst accesses, the data termination signals apply to individual beats and indicate the end of the tenure only after the final data beat.

Address-only transfers use only the address bus, with no data transfer involved. This feature is particularly useful in multi-master and multiprocessor environments, where external control of on-chip primary caches and TLB (translation look-aside buffer) entries is desirable. Additionally, the MPC60x provides a retry capability that supports an efficient "snooping" protocol for systems with multiple memory systems (including caches) that must remain coherent.

Pipelining and split-bus transactions, while they do not inherently reduce memory latency, can greatly improve effective bus-memory throughput. The MPC60x bus protocol does not constrain the maximum number of levels of pipelining that can occur on the bus between multiple masters. In a system in which multiple devices must compete for the system bus, external arbitration is required. The external arbiter must control the pipeline depth and synchronization between masters and slaves.

In a traditional pipelined implementation, data bus tenures are kept in strict order with respect to address tenures. However, external hardware can further decouple the address and data buses, allowing the data tenures to occur out of order with respect to the address tenures. Second-generation PowerPC computers include computers whose architecture was especially designed for high performance and that incorporated such hardware. This architecture supports true split-bus operation with ordered slaves and ordered masters. "Ordered" means each master and each slave has its own independent FIFO structure supporting "ordered" service to transactions posted to it. If a slave receives three transactions A, B, and C, then it will respond to A first, B second, and C third. If a master performs transactions D, E, and F, then it expects servicing of those transactions in the order of D first, E second, and F third. There can be up to a selected number of outstanding master/slave pair transactions in the architecture at one time. In one preferred embodiment, this selected number is three outstanding pair transactions. As a result, in the foregoing architecture, an expansion bridge may concurrently have one outstanding slave transaction to it and one outstanding master transaction from it. Although ordered masters and slaves, as opposed to unordered masters and slaves, provide an overall simplification to system architecture, they can lead to deadlocks when there are conflicting completion dependencies.

Deadlock occurs in a computer system when one resource cannot complete an access to another resource, and the access blocks other resources from performing transactions on the bus. Livelock occurs in a computer system when one resource cannot complete an access to another resource, does not block resources from performing transactions on the bus, but no forward progress can be made due to the resource's in-ability to complete its access.

Due to the plethora of design methodologies and implementations utilized by expansion card vendors, systems are most prone to deadlocks and livelocks when there is an expansion bus bridge in the system. This is particularly true when the buses on either side of the bridge follow different protocols. Some potential deadlocks may be detected and prevented at the bridge level; however, other pieces of the overall solution may need to be implemented at a higher level in system arbitration.

The main reason that a deadlock or livelock occurs is that each of two different resources that communicate with (each other assumes that it has top priority in the system. Unfortunately, when they communicate with each other this causes a conflict, and if one does not back off its access, the end result is deadlock or livelock.

In the architecture of certain PowerPC computers of the assignee, the top priority bus is known as the ARBus; it is the one bus assumed to never have to back off an access. However, there may be a need for the ARBus to communicate with a PCI bus behind an expansion bridge. In some instances, a PCI bus may have a bridge to an ISA bus, through a second bus bridge. Both PCI and ISA follow "single envelope" transaction protocols; that is, once initiated, a data transfer must be completed or cancelled before any other transaction can proceed over the bus. As history recalls, the ISA bus design assumed that any initiated access would complete; therefore, an ISA master would not have to back off its access. Therein lies the problem. The PowerPC architecture, in one instance, chose the ARBus to be the bus to not back off, and the PC-world chose the ISA bus to be the bus to not back off. When both buses are present in a single computer, this conflict of interest could result in deadlock.

In another instance, the PowerPC architecture may incorporate a PCI bus-to-PCI bus ("PCI2PCI") bridge having an interlocking behavior that disallows access to its slave port on one side of the PCI2PCI bridge while its master on the same side of the PCI2PCI bridge has a transaction to perform. This behavior also means that the PCI2PCI bridge assumes that it does not have to be backed off, and any communication between the ARBus and a target behind the PCI2PCI bridge could result in deadlock.

SUMMARY OF THE INVENTION

The present invention, generally speaking, provides a mechanism for avoiding deadlock in a computer system in which a split-transaction bus is bridged to a single-envelope bus. In one embodiment, transactions begun on said split-transaction bus are monitored. When a combination of transactions would, if a predetermined further transaction were to begin, result in deadlock, this condition is detected. The predetermined further transaction, if it is requested, is refused, thereby avoiding deadlock. In accordance with another embodiment of the invention, the bus bridge detects when a state of the split-transaction bus would, if a protocol of said split-transaction bus were adhered to, result in deadlock. The bus bridge then drives one or more signals on the split-transaction bus in disregard of the protocol of the split-transaction bus, thereby avoiding deadlock. In accordance with still a further embodiment of the invention, transactions accepted within the bus bridge are monitored. When a combination of said transactions would, if a predetermined further transaction were to begin, result in deadlock, this condition is detected. The predetermined further transaction, if it is requested, is refused, thereby avoiding deadlock.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

In the following description, the system architecture of a computer system in which the present invention may be used will first be described, including a description of the MPC601 bus, the ARBus, which is a superset of the MPC601 bus, a system arbiter and an expansion bridge. Deadlock avoidance will then be described, beginning with a description of the types of deadlocks and livelocks that may occur in the system, followed by a description of specific deadlock and livelock situations for both a system having a single expansion bridge and a system having two or more expansion bridges. Rules will be identified for avoiding deadlock. These rules will then be summarized, both for the case of a single expansion bridge and for the case of two or more expansion bridges. Finally, the manner in which the rules are implemented in the system will be described.

System Architecture

Figure 2:
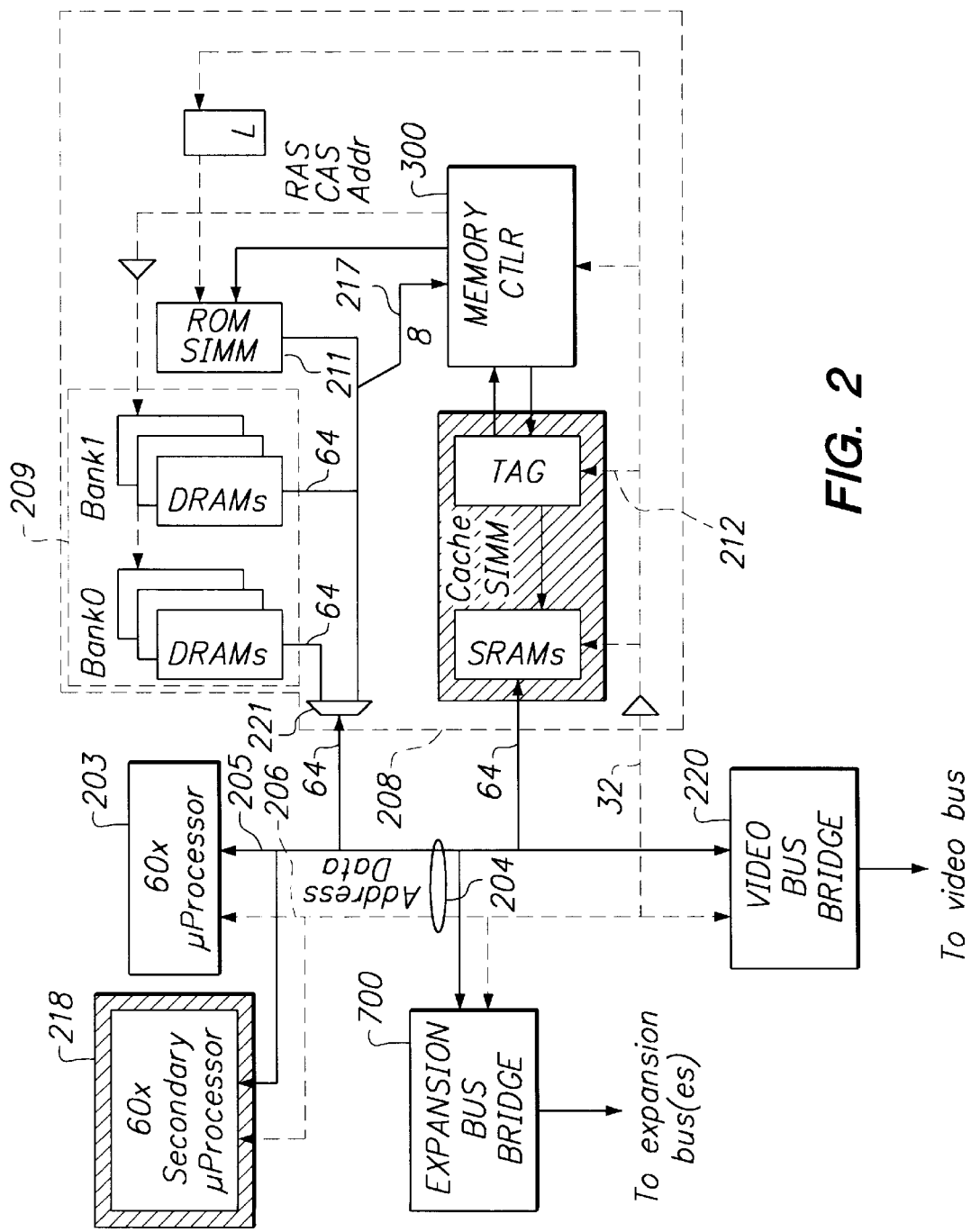
FIG. 2 is a system-level block diagram of a computer system in which the present invention may be used.

Referring now to FIG. 2, the present invention may be used in a computer system of the type shown. A CPU 203 (i or example a Power PC 601 microprocessor) is connected to a system bus 204, including a data bus 205, an address bus 206, and a control bus (not shown). A memory subsystem 208 includes, in the illustrated embodiment, a main memory 209, a read-only memory 211, and a level-two cache memory 212. The CPU 203, through the system bus 204, is connected directly to the level-two cache memory 212. The CPU 203 is connected indirectly to the main memory 209 and the read-only memory 211, through a datapath circuit 221 and a memory controller 300. In general, the datapath circuit 221 provides for 64- or 128-bit reads from and writes to memory, in either big-endian or little-endian mode. The memory controller 300 controls the various memory devices within the memory subsystem 208 in response to signals on the system bus 204 and, in particular, provides address and control signals (i.e., RAS and CAS) to the main memory 209. The datapath circuit 221 and the memory controller 300 are connected by a register data bus 217.

Also shown is an optional secondary processor 218 which, like the CPU 203, may be a Power PC 601 microprocessor for example.

The system bus 204 is also connected to an expansion bus bridge 219 (possibly more than one) and, optionally, a video bus bridge 220. In a preferred embodiment, the system bus 204 is a superset of the conventional Power PC 601 microprocessor interface referred to herein as the Apple RISC Bus, or ARBus. An expansion bus connected to the expansion bus bridge 219 may be a standard PCI bus. Likewise, a video bus connected to the video bus bridge 220 may be a PCI-like bus.

Figure 3:
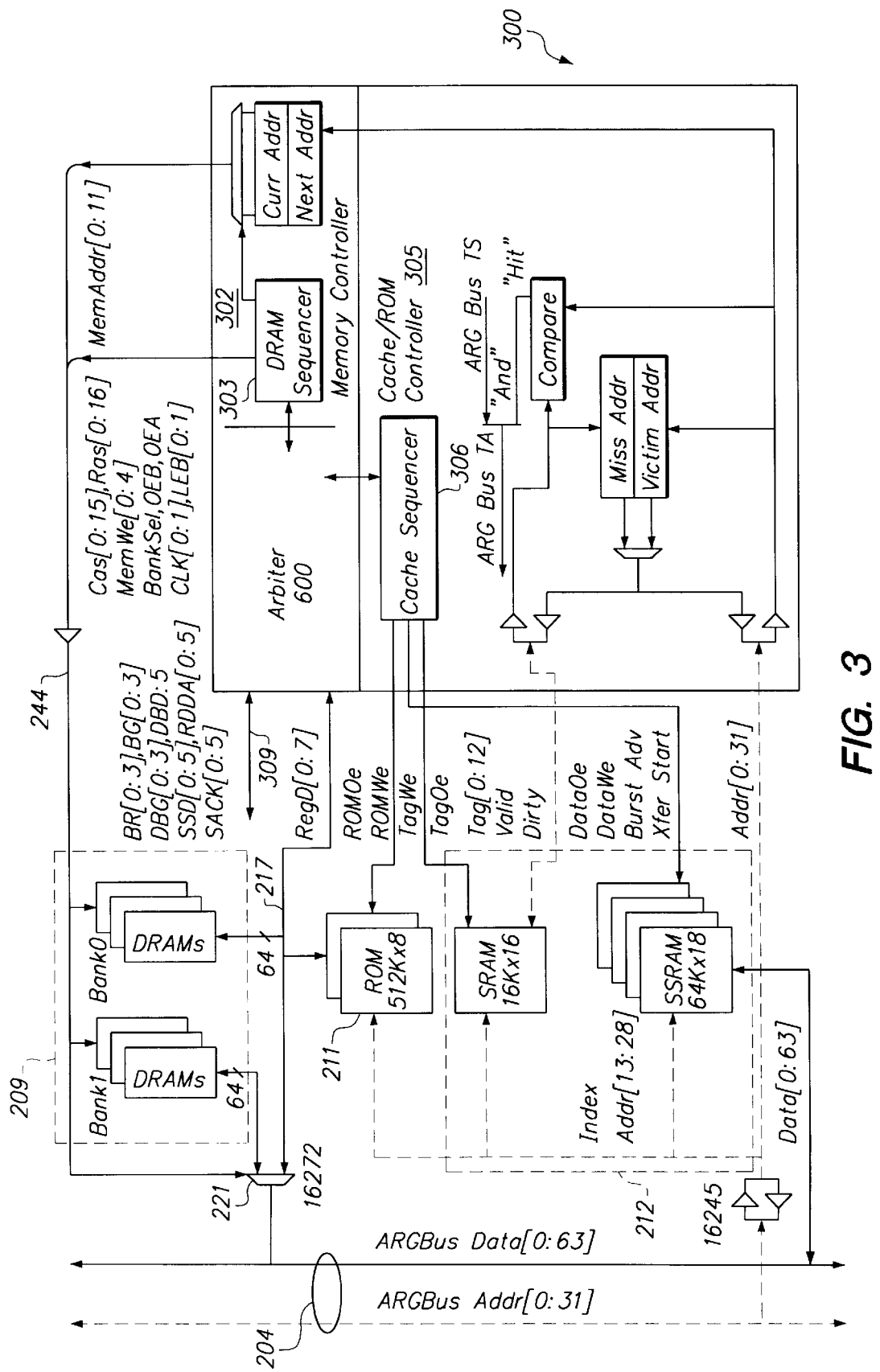
FIG. 3 is a block diagram of the memory controller 300 of FIG. 2.

Referring to FIG. 3, the memory subsystem 208 including the memory controller 300 of FIG. 2 are shown in greater detail, with particular emphasis on the various signals input to and output from the memory controller 300. The memory controller 300 includes a main memory controller 302, a cache/ROM controller 305, and an arbiter 600. The main memory controller 302 produces address and control signals for the main memory 209 and includes a DRAM sequencer 303 and certain memory address logic. The cache/ROM controller 305 produces control signals for the level-two cache memory 212 and the read-only memory 211 and includes a cache/ROM sequencer 306 and certain cache logic. Both the main memory controller 302 and the cache/ROM controller 305 exchange control signals with the arbiter 600, which executes overall control of the memory controller 300 and which is more particularly the subject of the following description.

The arbiter 600 includes a register file (not shown) that may be written and read by the CPU 203 across the register data bus 217. The register file includes, in addition to numerous base address registers, various ID, configuration and timing registers. The particulars of these registers are not essential to an understanding of the present invention and will not be further described. The arbiter 600 inputs various control signals from and outputs various control signals to a control bus 309. Some of the control signals carried by the control bus 309 are part of the conventional PowerPC 601 microprocessor interface. The majority of the signals carried by the control bus 309, however, are side-band information signals used in accordance with the present invention to independently control the address bus 206 and the data bus 205.

The MPC60x Bus

Prior to describing in detail the manner in which these side-band information signals are used to decouple the address bus 206 and the data bus 205, it will be useful to consider what is termed herein conventional usage of the PowerPC 601 microprocessor interface.

Figure 1:
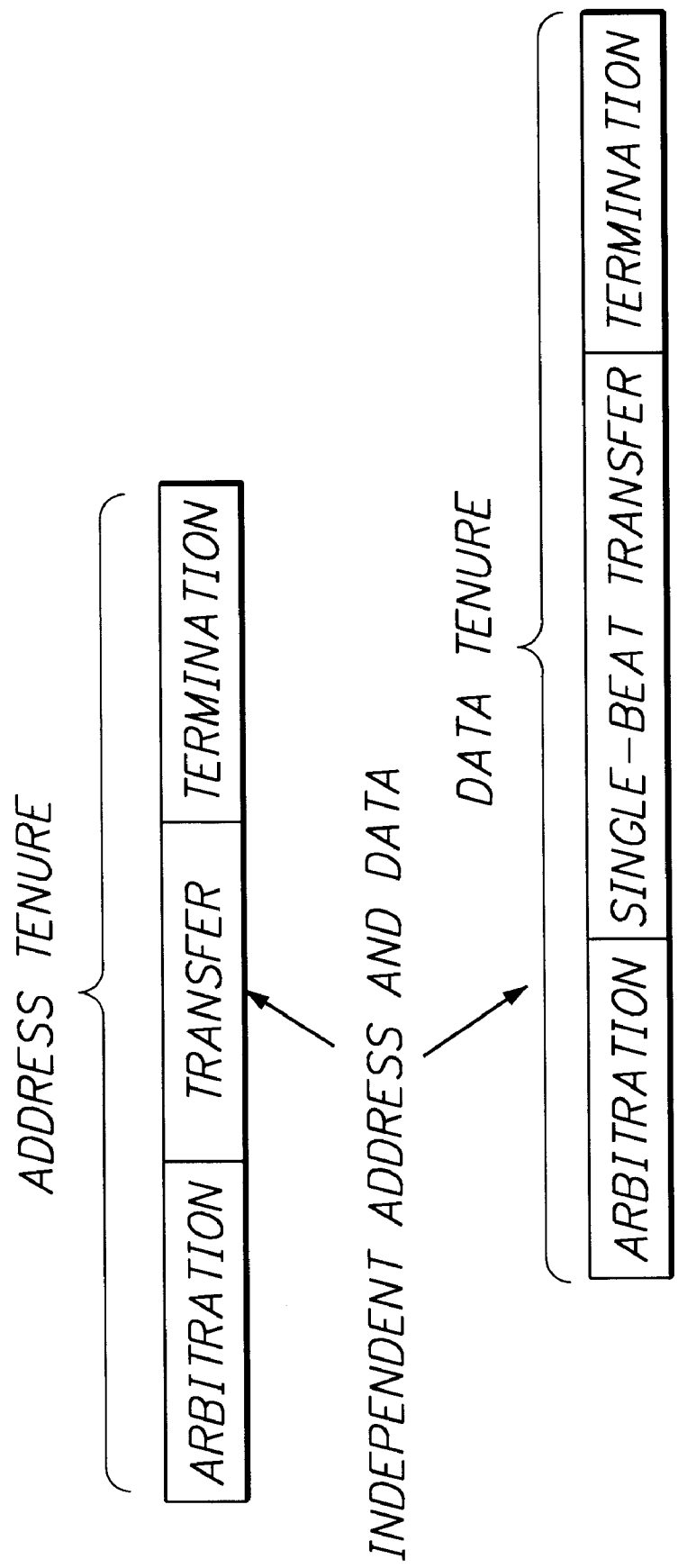
FIG. 1 is a diagram illustrating overlapping tenures for a single-beat transfer on a conventional MPC601 bus.
Figure 4:
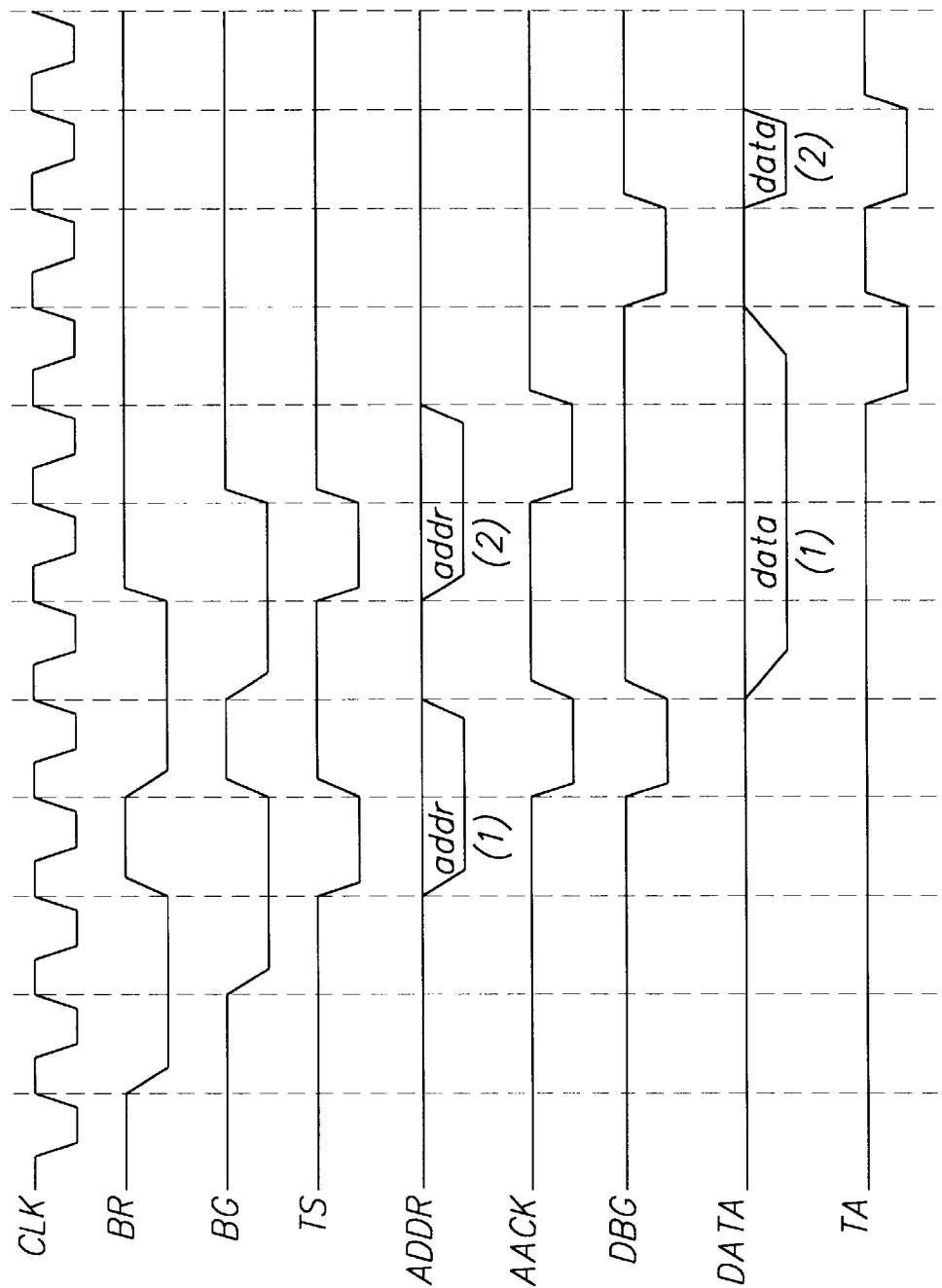
FIG. 4 is a timing diagram showing conventional usage of the MPC601 bus.

As shown in FIG. 1, address tenure and data tenure both have arbitration, transfer and termination phases. Each of these phases involves the exchange of respective handshaking signals. Referring to FIG. 4, the handshaking signals that characterize the address arbitration phase are a bus request signal BR and a bus grant signal BG. The bus request signal BR is an output signal of the CPU 203. The bus grant signal is an input signal of the CPU 203 and is output by the arbiter 600. Both the bus request signal BR and the bus grant signal BG relate to the address bus 206. When the CPU 203 has received the bus grant signal BG, it is free to enter the address transfer phase.

During the address transfer phase, a transfer start signal TS is asserted by the CPU 203 when the CPU 203 begins to drive the address bus 206. The address is decoded by a slave device as belonging to that address, i.e., falling within the device's assigned address space. During the address termination phase, the slave device asserts the address acknowledge signal AACK after it has sampled the address on the address bus 206.

During the address transfer phase, certain transfer attribute signals are used indicate the nature of transaction, including whether the transaction is an address-only transaction. Assuming that the transaction is not, then the transfer start signal TS is treated by the arbiter 600 as an implicit data bus request, starting the data arbitration phase. Following assertion of the acknowledge signal AACK, a data bus grant signal DBG is asserted by the arbiter 600 once the data bus 205 is available for use by the CPU 203. The CPU 203 may then begin the data transfer phase on the next cycle by driving the data bus 205. During a subsequent data termination phase, the slave device asserts a transfer acknowledge signal TA after it has sampled the data on the data bus 205.

The foregoing sequence of operations is repeated for a second subsequent transaction. In FIG. 4, the transaction to which address and data information pertain is indicated in parentheses, i.e., transaction (1) and transaction (2).

Note that in FIG. 4, address tenures and data tenures, although they may be pipelined, are tightly ordered. That is, data bus tenure on the system is granted in the same order as address tenure is granted even if the address tenures are granted to different masters. In precise terms, if TS(n) is for Master A and TS (n+1) is for Master B, then DBG(n) will be for Master A and DBG(n+1) will be for Master B.

This tight ordering of the conventional MPC601 bus may result in considerable system performance degradation especially as bus speed increases. A read transaction to an expansion-bus device, for example, will typically be high-latency as compared to a main-memory read transaction. Tight ordering of address and data tenures results in such latency impacting the data bus. That is, even though another transaction might be ready to use the data bus first, during the latency period, it cannot because of the tight ordering of address and data tenures. If a system is to handle information streams having real-time constraints, such as video streams, it is important to ensure that the data bus is not unavailable for use during substantial periods of time; otherwise real-time deadlines may be missed, resulting in objectional artifacts during presentation.

The ARBus

The architecture of the computer system of FIG. 2 decouples address and data tenures such that data bus utilization is increased. This increase in data bus utilization allows for higher real-time performance to be achieved. In particular, the present invention allows for a true split-bus architecture with ordered slaves and ordered masters. "Ordered," in one usage, means each master and each slave has its own independent FIFO structure supporting "ordered" service to transactions posted to it. If a slave receives three transactions A, B, and C, the it will respond to A first, B second, and C third. If a master performs transactions D, E, and F, then it expects servicing of those transactions in the order of D first, E second, and F third. In one embodiment, there can be up to three outstanding master/slave pair transactions at one time.

Referring briefly again to FIG. 3, the side-band information signals carried by the control bus 309 are side-band information signals used to decouple the address bus 206 and the data bus 205. These side-band information signals include, in addition to the bus request signal BR, the bus grant signal BG and the data bus grant signal DBG of FIG. 4, corresponding signal for each master besides the CPU 203.

In one embodiment, the system includes, besides the CPU 203, four additional masters for up to a total of five masters: the CPU 203, the secondary processor 218 (if present), the expansion bus bridge 219, one additional expansion bus bridge (if present), and the video bus bridge 220 (if present). The control bus 309 therefore carries five bus request signals BR[0:4], five bus grant signals BG[0:4], and five data bus grant signals DBG[0:4].

In the same embodiment, the system includes six slaves: the expansion bus bridge 219 (also a master), the additional expansion bus bridge (also a master, if present), the video bus bridge 220 (also a master, if present), the main memory 209, the read-only memory 211, and memory controller registers accessible via the register data bus 217. For each slave, the control bus 309 carries three signals: a slave acknowledge signal SACK, a read data available signal RDDA, and a source- or sink-data signal SSD. The control bus 309 therefore carries six slave acknowledge signals SACK[0:5], six read data acknowledge signals RDDA[0:5], and six source- or sink-data signals SSD,[0:5].

Figure 5:
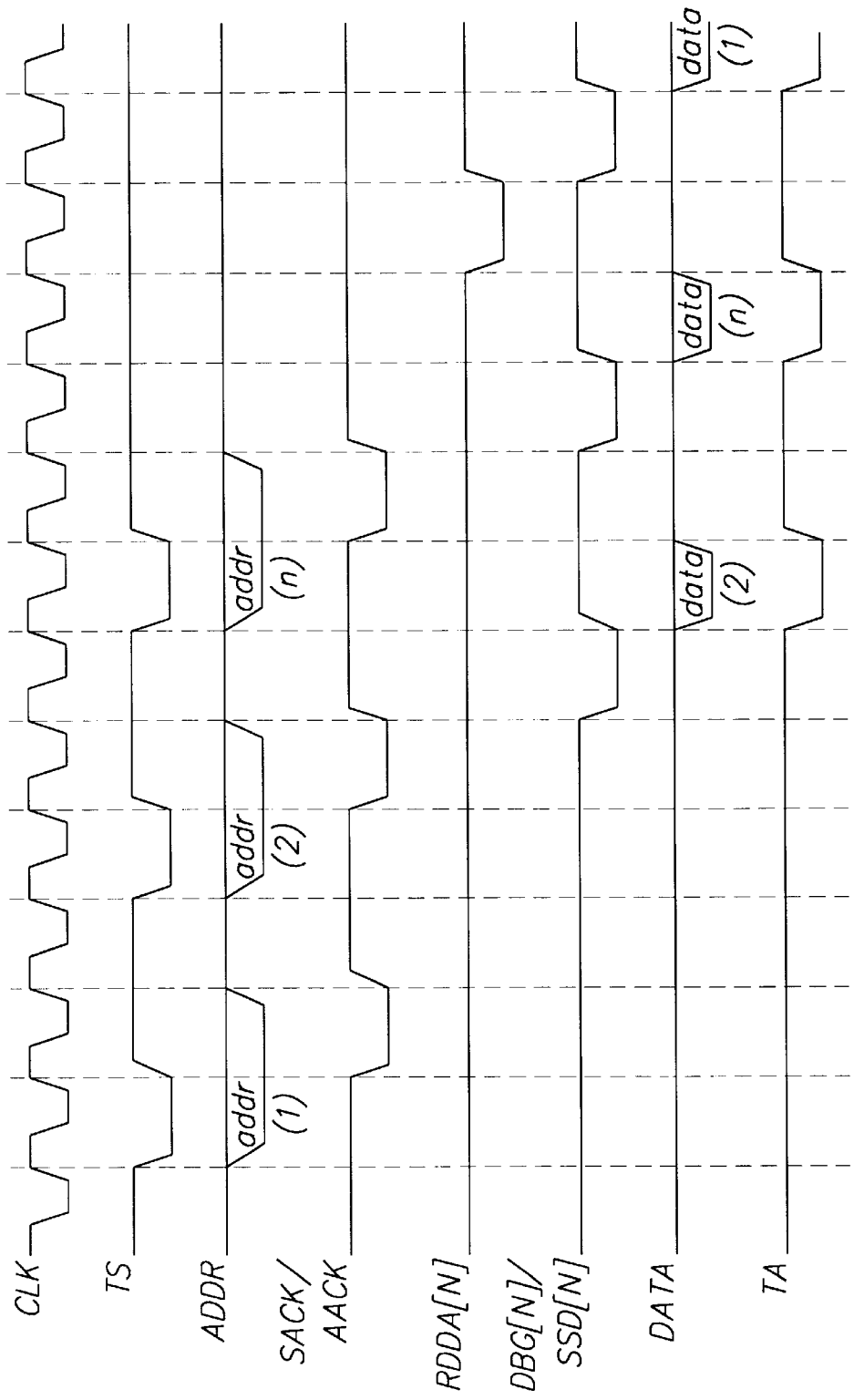
FIG. 5 is a timing diagram showing usage of the ARBus (a superset of the MPC601 bus) in the high-performance computer architecture of FIG. 2.

The manner in which the foregoing signals are used to decouple address tenures and data tenure may be appreciated with reference to FIG. 5. For simplicity, the address arbitration phase has not been illustrated. The address transfer phase is essentially the same as in the conventional case. The address termination phase, however, differs. The addressed slave asserts the AACK signal in the conventional manner, the AACK signal being used by the master. In parallel with AACK, the addressed slave generates a SACK signal for use by the arbiter 600. The arbiter uses this information about which slave has acknowledged in order to reorder transactions on the system bus 204.

In the data arbitration phase, the data bus is granted to masters based on a priority ordering of masters, and is granted to slaves based in part on the priority of the master of the transaction and in part on the availability of data from the slave. What may be considered in effect two sets of grant signals are therefore defined, DBG[0:#Masters-1] for masters and SSD[0:#Slaves-1] for slaves.

Assume, for example, that in FIG. 5 the first transaction is a read by the CPU 203 from the expansion bus bridge 219 and that the second and third transactions are writes to memory from the video bus bridge 220. In general, video transactions will be assigned a higher priority than transactions by the CPU 203 because of the real-time requirements of video transactions. Data bus grant signals are therefore issued to video bus bridge 220 for the first video transaction (2), which proceeds through the data transfer phase, and the second video transaction (n), which also proceeds through the data transfer phase. The CPU 203 will not be issued a data bus grant signal for its read from the expansion bus bridge 219 until a read data acknowledge signal has been returned to the arbiter 600 from the expansion bus bridge 219. Then, the CPU 203 will be issued a data bus grant signal for its read and the expansion bus bridge 219 will simultaneously be issued a corresponding slave source-data signal causing it to present its data on the data bus 205 to be sampled by the CPU 203.

As may be appreciated from the foregoing description, the data arbitration phase in accordance with the present invention is very different than in the conventional case. This different manner of operation allows address and data tenures to be decoupled, increasing utilization of the data bus. The data transfer and data termination phases, however, are essentially the same as in the conventional case.

The System Arbiter

Transaction reordering is controlled by the arbiter 600. The general characteristics of the arbiter 600 will first be described, after which the arbiter 600 will be described in greater detail.

The basic behavior that the arbiter 600 guarantees is as follows:

Any given ARBus master has its own address and data tenures strictly ordered. That is, DBG(n) always corresponds to TS(n) and for a set of TS(n) and TS(n+1), DBG(n) will always occur before DBG(n+1).

Any given ARBus slave has its own data tenures strictly ordered. That is, SSD(n) always corresponds to TS(n) and for a set of TS(n) and TS(n+1), SSD(n) will always occur before SSD(n+1).

Data bus tenure is not necessarily granted on the ARBus in the same order as address tenure is granted if the address tenures are granted to different masters. That is, if TS(n) is for Master A and TS(n+1) is for Master B, DBG(n) may be for Master B and therefore DBG(n+1) for Master A.

In the illustrated embodiment, the arbiter 600 supports five logical masters. The five masters arbitrate for use of the bus in accordance with a fixed priority as follows: the video bus bridge 220, the expansion bus bridge 219, an additional expansion bus bridge (if present), the CPU 203, and the secondary processor 218. By giving highest priority to the video bus bridge 220, the arbiter 600 allows the video bus bridge 220 to "hog" the ARBus.

The arbiter 600 may optionally "park" the CPU 203 or the video bus bridge 220 on the ARBus by asserting the appropriate BG wire during idle bus cycles. The default mode of operation is to park the most recent master.

Address bus arbitration occurs in every cycle that an address tenure is not active. Masters assert their individual bus request signals (BR) to the arbiter 600 to signal a request for service. The arbiter 600 signals the master which has won the arbitration by asserting bus grant (BG). Masters that have BG asserted in a given cycle are free to assert TS and therefore start a transaction in the next cycle. Address bus arbitration may be performed in accordance with a routine set forth in Appendix A.

The arbiter 600 controls the use of the data signals as a function of the address and the availability of read data. If a given ARBus address receives an AACK, the arbiter 600, by sampling the SACK signals, knows which slave will accept write data or will return read data. A slave that asserts AACK for a write transaction gives implicit permission to the arbiter 600 to grant the data bus to the master and allow it to assert the associated write data. Slaves must assert RDDA when requested return read data is available.

The arbiter 600 grants the data bus to a selected master via the assertion of DBG (Data Bus Grant) and indicates to the slave that data is to be asserted or accepted via the assertion of SSD (Source or Sink Data). Data bus arbitration may be performed in accordance with a routine set forth in Appendix B.

Transactions which do not involve a data transfer (Address-Only transactions) are typically generated by the CPU 203 or the secondary processor 218 and are simply acknowledged (AACK asserted) by the arbiter 600.

Figure 6:
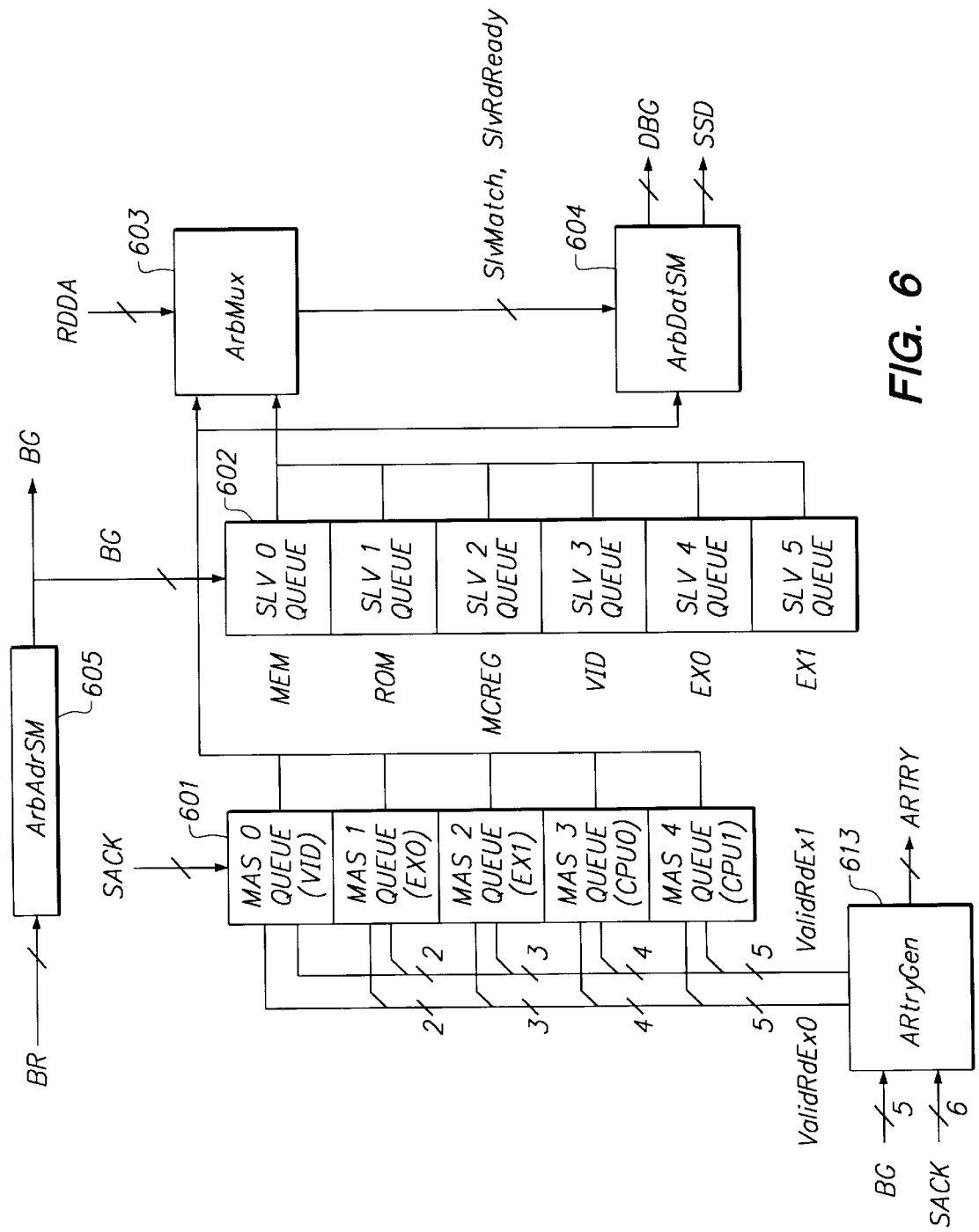
FIG. 6 Is a block diagram of the arbiter 600 of FIG. 3.

Referring now to FIG. 6, the arbiter 600 will be described in greater detail. The arbiter 600 includes master queues 601, one for each master in the system, and slave queues 602, one for each slave in the system. Each of the master queues 601 are connected at their respective data inputs to a SACK vector composed of the slave acknowledge signals SACK of each of the slaves, in addition to a Rd/Wr signal. Hereinafter, the term "SACK vector" will be understood to mean signals including the slave acknowledge signals SACK of each of the slaves and the Rd/Wr signal. Each of the slave queues 602 are connected at their respective data inputs to a BG vector composed of the bus grant signals BG of each of the masters. (In more precise terms, the BG vector is the physical bus grant signals sampled in the cycle that the TS signal is asserted.) The bus grant signals BG are produced by an address bus arbiter state machine 605 in response to the bus request signals BR of each of the masters.

Each time the address acknowledge signal AACK is presented on the system bus 204, the master queues 601 and the slave queues 602 are updated by pushing the SACK vector onto one (and only one) of the master queues 601 and pushing the BG vector onto one (and only one) of the slave queues 602. In particular, the SACK vector is pushed onto one of the master queues 601 identified by the BG vector, and the BG vector is pushed onto one of the slave queues 602 identified by the SACK vector.

The SACK vectors at the heads of the master queues 601 and the BG vectors at the heads of the slave queues 602 are input to an arbiter multiplexer 603. The arbiter multiplexer 603 looks at the SACK vectors at the head of the master queues 601 and determines which of the slave queues 602 designated by the SACK vectors have at their heads a BG vector that designates the reciprocal one of the master queues 601. On the next data tenure of the masters for which this condition is satisfied, data will be sourced from the corresponding slave. The arbiter multiplexer 603 also receives a read-ready vector RDDA composed of the read data acknowledge signals RDDA of each of the slaves.

Based on the foregoing input signals, the arbiter multiplexer 603 produces a slave match vector SlvMatch and a slave read ready vector SlvRdReady. The slave match vector SlvMatch designates those masters finding matching slaves, i.e., slaves expecting to next respond to transactions from those respective masters. The slave read ready vector SlvRdReady identifies, of those masters, which have slaves that are actually ready to source data. The slave match vector SlvMatch and the slave read ready vector SlvRdReady are input to an data bus arbiter state machine 604.

The SACK vectors at the head of the master queues 601 are also input to the data bus arbiter state machine 604. The data bus arbiter state machine 604 determines which transaction is ready to go by examining the bits of the SlvMatch vector in priority order and, it a bit indicates a matching master/slave pair, determining further whether either the transaction is a write transaction (by examining the Rd/Wr bits at the fron master queue entries) or the corresponding bit in the SlvRdReady vector is set, indicating that the slave is ready to source data. In Verilog notation, the data bus arbiter state machine 604 computes a vector TransReady as follows:

TransReady[0:4]=SlvMatch[0:4]&({5{Write}}||SlvRdReady[0:4])

Based on the computed TransReady vector, the data bus arbiter state machine 604 asserts a corresponding one of the data bus grant signal DBG. The data bus arbiter state machine 604 also asserts a corresponding one of the source-or-sink-data signals SSD, in accordance with the SACK vector at the front of the winning master queue.

Operation of the arbiter 600 may be further understood from the following illustrative examples.

To take a relatively simple example, assume that Master 1 (the expansion bus bridge 219) issues a read transaction to Slave 3 (the video bus bridge 220). Slave 3, when it is ready to service the transaction, asserts the AACK signal on the ARBus and, at the same time, generates a SACK signal to the arbiter 600 identifying Slave 3. When the arbiter 600 receives the AACK signal, the SACK vector is pushed onto one of the master queues 601 based on the BG vector. At the same time, the SACK vector is pushed onto one of the master queues 601 based on the BG vector. Assuming that no other transactions are presently queued, a SACK vector value representing Slave 3 (for example b111011) will appear at the head of the one of the master queues 601 for Master 1, and a BG vector value representing Master 1 (for example b10111) will appear at the head of the one of the slave queues 602 for Slave 3. The arbiter multiplexer 603 will therefore cause the SlvMatch vector to have a value indicating a match for Master 1 (for example b01000). When Slave 3 is ready with read data, it will assert its RDDA signal, in response to which the arbiter multiplexer 603 will cause the SlvRdReady vector to have a value indicating the readiness of Slave 3 (for example b00100). If no other transactions having higher priority have in the meantime become ready to go, the data bus arbiter state machine 604 will then issue a data bus grant signal DBG to Master 1 and a sink/source data signal SSD to Slave 3, and the data transfer phase of the transaction will proceed.

To take another, more complex example, assume that after Master 1 has issued the foregoing transaction request (shown below as Transaction 1) but before Slave 3 has responded with an RDDA signal, a series of further transactions is issued, in accordance with the following chronological sequence:

1. Master 1 Rd Slave 3
2. Master 3 Wr Slave 3
3. Master 3 Wr Slave 0
4. Master 4 Rd Slave 1
5. Master 2 Wr Slave 4

Note that transactions 1 and 2 both involve Slave 3, and transactions 2 and 3 both involve Master 3. Because masters and slaves are ordered, data dependencies are created. That is, transaction 2 cannot complete until transaction 1 has completed. Similarly, transaction 3 cannot complete until transaction 2 has completed. Transactions 4 and 5, on the other hand, have no data dependencies. Transaction 4 is a read from Master 4 (CPU 1) to Slave 1 (ROM). In the case of ROM and RAM, because read latency is minimal and is know in advance, the RDDA signals for ROM and RAM are tied asserted.

Transaction 2, Master 3's write, of Slave 3, is queued up behind Master 1's read of Slave 3. Transaction 3, Master 3's write of Slave 0, is queued up behind Master 3's write of Slave 3. When transaction 4 is queued, there are matching queue entries at the head of the master and slave queues for transactions 1 and 4. Transaction 1, however, is a read transaction and is not allowed to proceed until an RDDA is received from Slave 3.

Therefore, the arbiter 600 first grants the data bus to Master 4 and Slave 1 for transaction 4. When transaction 5 is queued, there are matching queue entries at the head of the master and slave queues for transactions 1 and 5. Assume, however, that an RDDA has still not been received from Slave 3. The arbiter 600 will then grant the data bus to Master 2 and Slave 4 for transaction 5.

Assume now that an RDDA is received from Slave 3. Transactions 1, 2 and 3 will then, in that order, be granted the bus and will complete. In the foregoing example, whereas the address order of the transactions is 1, 2, 3, 4, 5, the data order is 4, 5, 1, 2, 3.

When the system it totally idle, i.e., the data bus is not busy and all queues are empty, a CPU memory read transaction is executed immediately without queuing the transaction.

Further details concerning the arbiter 600 and split-bus operation may be found in copending U.S. application Ser. No. 08/432,620 entitled "Bus Transaction Reordering Using Side-Band Information Signals", filed concurrently herewith (Attorney's Docket No. P1605/172), incorporated herein by reference. Additional details concerning the video bus bridge 220 may be found in copending U.S. application Ser. No. 08/888,113 entitled "Deadlock Avoidance in a Split-Bus Computer System," filed concurrently herewith (Attorney's Docket No. P1661/179), also incorporated herein by reference.

The Expansion Bridge

The expansion bridge responds to transactions on the ARBus and PCI Bus and forwards them to the "other" bus appropriately. The primary function of the expansion bridge is to map transactions from one bus to the other. The job of the expansion bridge to transfer data between the ARBus and the PCI Bus is complicated by the fact that the ARBus and the PCI Bus are very different in a number of respects as shown in the following table:

TABLE I

| BUS CHARACTERISTIC | BUS | |
|---|---|---|
| | ARBUS | PCI BUS |
| ADDRESS/DATA TENURES | Full split transaction (pended) | Single envelope (non-pended) |
| ENDIANESS | Big endian | Little Endian |
| CYCLE TYPES | One cycle type | Many cycle types |
| TRANSACTION LENGTHS | Fixed (32-byte) burst length | Arbitrary length transactions with byte-enabled writes |
| BUS SPEED | Up to 50 MHz | 33 MHz |

The PowerPC architecture and the ARBus do not "naturally" generate many types of cycles that are required by the PCI specification. These unique PCI Bus cycles are included in the PCI specification to provide backwards compatibility for x86/ISA/IBM PC-AT cards and software. The expansion bridge provides facilities for generating PCI Bus configuration cycles, I/O cycles and PCI "Special Cycles"/"Interrupt Acknowledge" via special address spaces.

Figure 7B:
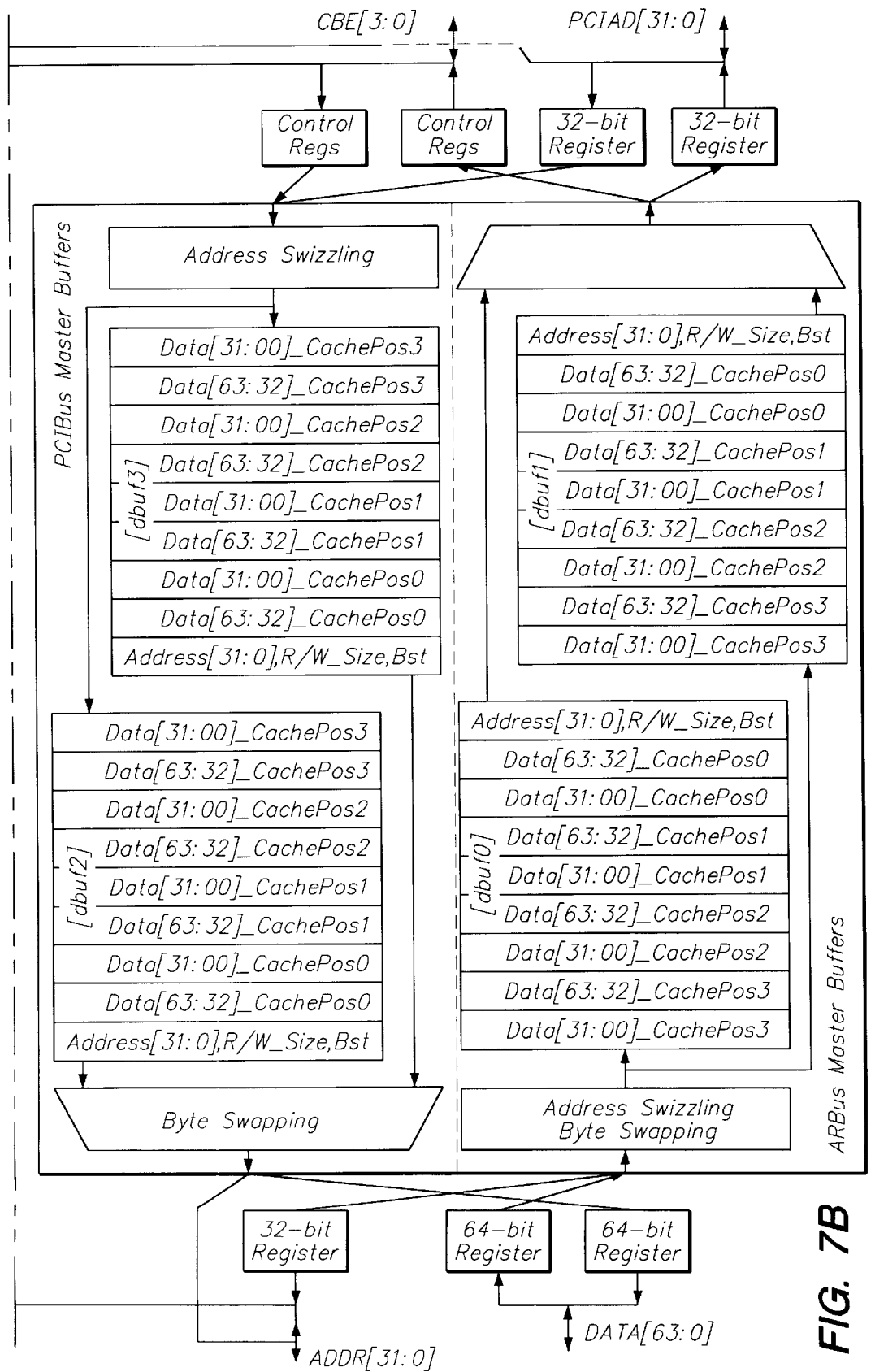
FIG. 7 is a block diagram of the expansion bridge 700 of FIG. 2.

Referring now to FIG. 7, the expansion bridge 700 will be described in greater detail. The expansion bridge is constructed with two main state machines for the ARBus and PCI Bus. The two main state machines actually consist of a number of smaller sub-state machines. These state machines operate in different clock domains and require that handshake signals be synchronized. Transactions passed between the ARBus and the PCI Bus are staged in a large packet-buffer structure. Data endian conversion is performed on the ARBus side of the packet buffer with data being stored in the packet buffer in PCI Bus Little Endian format. Address endian swizzling is performed on the master side of a transaction. For a master cycle to the PCI Bus from the ARBus, the address swizzling occurs on the ARBus side. For a master cycle to the ARBus from the PCI Bus, the address swizzling occurs on the PCI Bus side.

Deadlock Avoidance

As explained previously, systems are most prone to deadlocks and livelocks when there is an expansion bridge in the system. In the description that follows, a deadlock will be introduced, together with its LockUp type (A,B,or C as described below), a solution for the deadlock, and where in the system the deadlock prevention logic preferably resides. Deadlock prevention rules assume a starting point behavior in which the expansion bridge allows concurrent reads through the bridge, and the ARBus arbiter performs the DBWO* protocol as necessary. The DBWO* protocol allows the Processor to re-order a write data phase around a read data phase for snoop pushes.

Types of Deadlocks and Livelocks

An entire class of deadlocks and livelocks is related to the PCI Bus being stalled during reads. During a read, the PCI Bus can potentially remain stalled for micro-seconds at a time when the target of the read is on the other side of a bridge. For instance, a Master on PCI Bus 1 wants to read from a target behind a PCI2PCI bridge on PCI Bus 2. In this case the master incurs the latency of three bridges (a first expansion bus bridge, a second expansion bus bridge, and a PCI2PCI bridge) before actually reaching the target, and no other transactions can occur on PCI Bus 1 as long as the read is stalling the bus. If other transactions from the ARBus were able to get access to the PCI Bus and complete, then the class of deadlocks related to conflicting completion orders would disappear. This type of lockup is referred to herein as Type-A LockUp.

Another class of deadlocks and livelocks is related to the ISA bus and PCI2PCI bridge behavior. When an ARBus read occurs to an ISA bus or a target behind a PCI2PCI bridge, it has no way of knowing whether it will complete or be blocked. A "block" can occur for the ISA bus if there is an ISA bus master already on the ISA bus with a pending transaction; this transaction may or may not require PATENT ARBus access. A "block" can also occur for the PCI2PCI bridge if the bridge has writes posted to it that it must perform on the host side of the PCI2PCI bridge before completing the read. In either of these two cases, there is an ARBus master that will wait forever for its read to either the ISA bus or PCI2PCI bridge to complete. If anything "blocks" the ISA bus or PCI2PCI bridge from completing its non-back-offable access, deadlock will occur. This type of lockup is referred to herein as Type-B LockUp.

A third class of deadlocks and livelocks is related to the ARBus arbiter being fixed priority, and to cross-communication problems between devices on the bus who are both masters and slaves. Lower priority masters can be starved from gaining ownership of the ARBus when following the generic ARBus rules set forth for behavior following an ARBus ARTRY*. If in addition, the lower priority master is unable to accept transactions as a slave, deadlocks or livelocks can occur. This type of lockup is referred to herein as Type-C LockUp.

Deadlock avoidance is complicated by the fact that in some systems there may be more than one expansion bridge. Hence, deadlocks in a true split bus architecture having only a single expansion bridge connected to the ARBus will be considered first, followed by a consideration of deadlocks in a true split bus architecture having two expansion bridges. Systems having more than two expansion bridges will not be considered, although similar deadlock avoidance principles may be applied to such systems.

Deadlock Avoidance: Single Expansion Bridge, Split Bus, Fixed Priority, Ordered Masters and Slaves Various deadlocks can occur with a single expansion bridge in a system implemented with a split bus (ARBus), ordered masters, ordered slaves, and utilizing a fixed priority arbitration scheme for the masters on the ARBus. These deadlocks can also occur in a dual expansion bridge system with the same characteristics, but only one expansion bridge need be involved to cause the deadlock.

Figure 8:
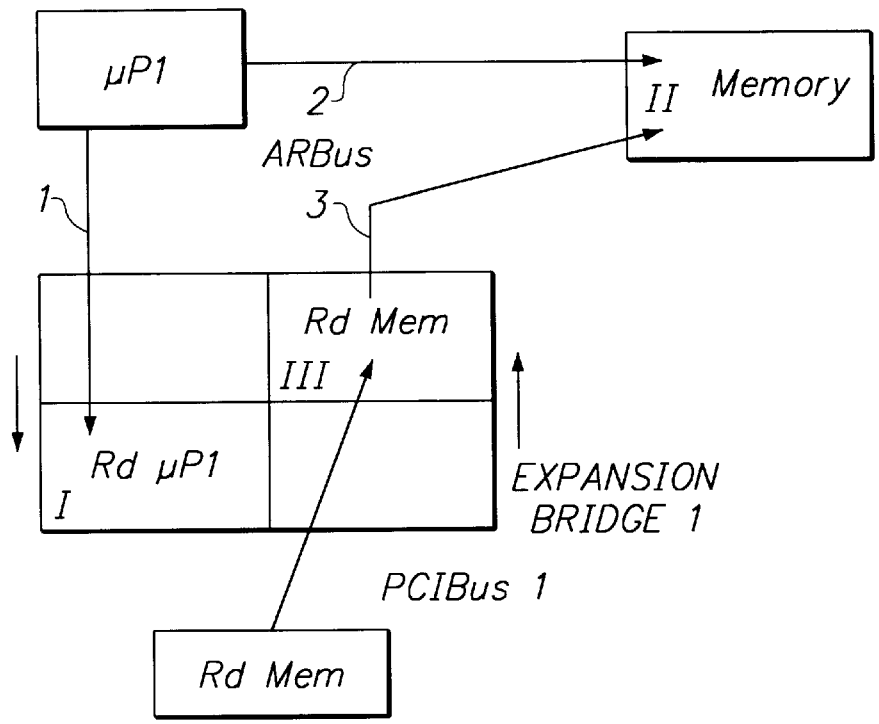
FIG. 8 illustrates a deadlock in which an ARBus master read of an expansion bridge is followed by an ARBus master read of memory.

Referring to FIG. 8, deadlock may occur when an ARBus master read of an expansion bridge is followed by an ARBus master read to memory. A typical sequence of transactions is as follows:

1. PCI Bus 1 Master initiates read of main memory, and stalls PCI Bus 1.
2. Processor 1 reads target behind Expansion Bridge 1 (Expansion Bridge 1 AAck*s without ARTRY*).
3. Processor 1 reads main memory (Memory Controller AAck*s without ARTRY*).
4. Expansion Bridge 1 forwards read of main memory (Memory Controller AAck*s without ARTRY*).

Master Processor 1 has ordered itself: a) Expansion Bridge 1, b) Read main memory. Slave main memory has ordered itself: a) Read by Processor 1, b) Read by Expansion Bridge 1. PCI Bus 1 has an implied ordering of a) Read main memory, b) Read by Expansion Bridge 1. PCI Bus 1 is stalled by the read of main memory and will not get off the bus until the read has completed. In this case, the completion order of Master Processor 1 directly conflicts with completion order of PCI Bus 1. This is a Type-A LockUp. There are two potential solutions: 1) Retry the Expansion Bridge 1 read of main memory, OR 2) Retry the Processor 1 read of main memory. For reasons described hereinafter, Solution 2 is preferred for ease of implementation. This deadlock is therefore avoided by having the ARBus arbiter prevent the Processor from reading main memory (via ARTRY*) following the Processor's read of an expansion bridge.

Figure 9:
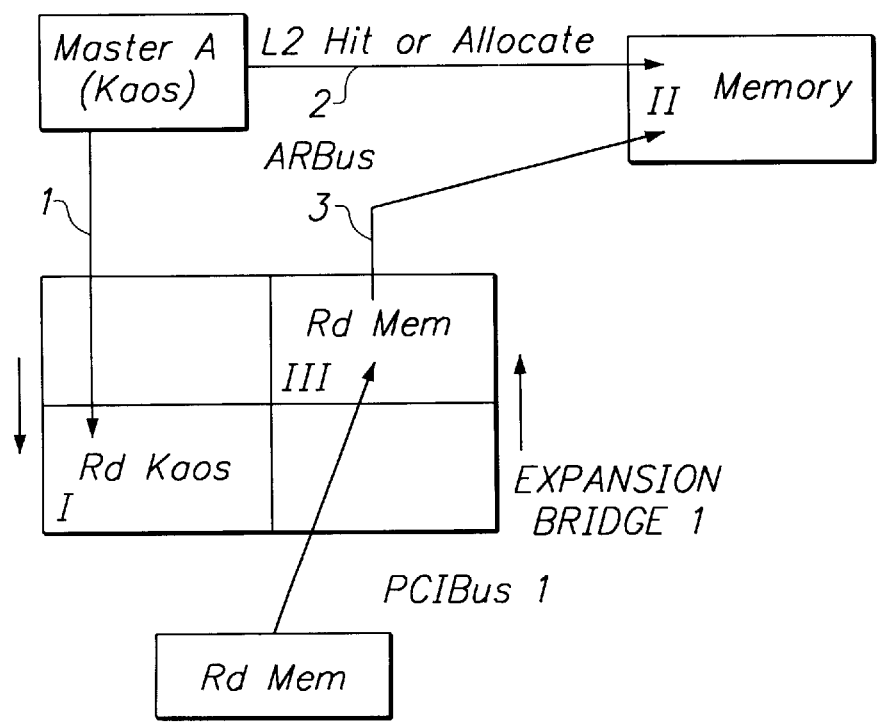
FIG. 9 illustrates a deadlock in which an ARBus master read of an expansion bridge is followed by an ARBus master L2 hit or allocate operation.

Referring to FIG. 9, deadlock may occur when an ARBus master read of an expansion bridge is followed by an ARBus master L2 hit or allocate operation. A typical sequence of transactions is as follows:

1. PCI Bus 1 Master initiates read of main memory, and stalls PCI Bus 1.
2. Master A reads target behind Expansion Bridge 1 (Expansion Bridge 1 AAck*s without ARTRY*).
3. Master A issues memory read causing the L2 (second level cache) to allocate the cache line.
4. Expansion Bridge 1 must complete its read of main memory, but it cannot complete.

Because the TAG SRAMs utilize a latch to capture the address from the main Address Bus during a TS_, no future TS_ can occur until the completion of the TAG update. The system arbiter prevents future TS_ events by deasserting all Bus Grants to Masters until the completion of the TAG update. Unfortunately, in the scenario described above, the TAG update will not complete until the PCI Bus Master A read of main memory has occurred. Master A has ordered itself: a) Read of Expansion Bridge 1, b) Read of main memory. Expansion Bridge 1 has ordered itself: a) Read of main memory, b) Read by Master A. This is a Type-A LockUp. Since the TAG update must complete without future occurrences of TS_, the deadlock fix is to have the ARBus arbiter prevent an access by Master A that would cause a second level cache hit or allocate (via ARTRY*) following Master A's read of an expansion bridge.

Figure 10:
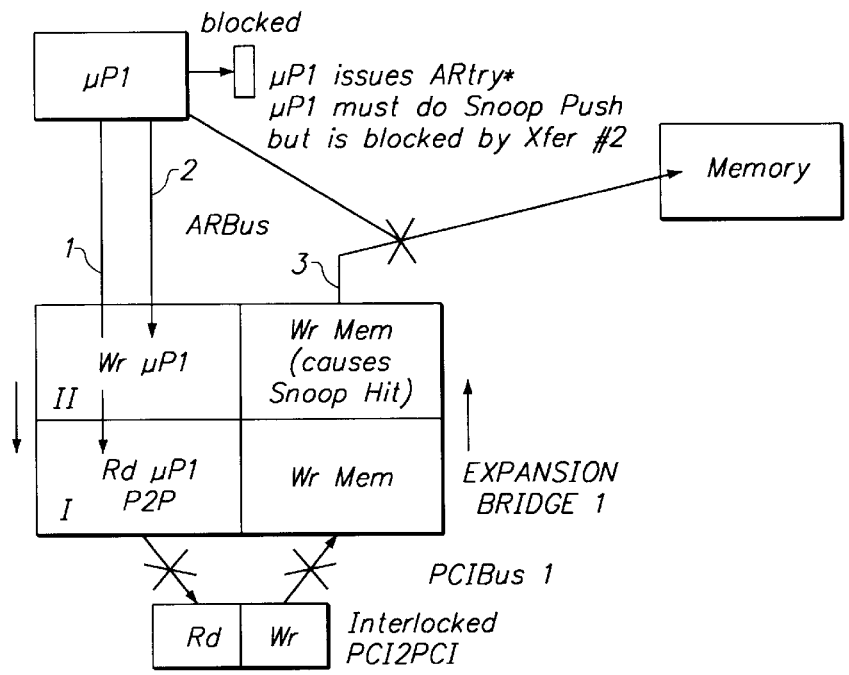
FIG. 10 illustrates a deadlock in which a processor read of an expansion bridge is followed by a processor write to that expansion bridge.

Referring to FIG. 10, deadlock may occur when a processor read of an expansion bridge is followed by a processor write to that expansion bridge. A typical sequence of transactions is as follows:

1. Processor 1 reads target behind PCI2PCI bridge behind Expansion Bridge 1. PCI2PCI bridge blocks read completion in order to flush posted write data to target upstream of PCI2PCI bridge.
2. Processor 1 writes target behind Expansion Bridge 1.
3. Expansion Bridge 1 write attempt to main memory causes Processor 1 to attempt Snoop Push.

The PCI2PCI bridge has become interlocked, and must flush a posted write upstream of itself; in this case the write is headed toward the ARBus, and Expansion Bridge 1's buffers are full and cannot currently accept the write. The first two outstanding transactions in this scenario are 1) Master Processor 1 has an outstanding read of Expansion Bridge 1, followed by 2) Master Processor 1 has an outstanding write to Expansion Bridge 1. The third attempted transaction is a write cycle from Expansion Bridge 1 to main memory. However, this write cycle is to copyback-cacheable space and causes a snoop hit in Processor 1's cache. Processor 1 retries Expansion Bridge 1's write cycle, but now needs to push the dirty cache line to main memory. However, at this point it is unable to push the dirty cache line due to its outstanding write to Expansion Bridge 1. With the use of DBWO*, Processor 1 could have re-ordered the snoop push write transaction around its outstanding read of Expansion Bridge 1 (transaction number 1). However, the MPC60x microprocessor is not capable of re-ordering the snoop push write transaction around its own outstanding write. This is a Type-B LockUp, caused by Processor 1's inability to complete its read due to the PCI2PCI bridge's interlocking behavior. This deadlock is avoided by having the ARBus arbiter prevent the Processor from writing to an expansion bridge if it has an outstanding read of the expansion bridge. This will allow the Processor to perform the Snoop Push write transaction if required.

Deadlock Avoidance: Dual Expansion Bridges, Split Bus, Fixed Priority, Ordered Masters and Slaves There is a set of deadlocks that only occur with more than one an expansion bridge in a system implemented with a split bus (ARBus), ordered masters, ordered slaves, and utilizing a fixed priority arbitration scheme for the masters on the ARBus. In one particular system architecture, high to low priority is: 1) Video, 2) Expansion Bridge 1, 3) Expansion Bridge 2, 4) Processor 1, 5) Processor 2. Deadlock rules described previously also apply to a multiple expansion bridge environment. The following new rules are in addition to the previous rules.

Figure 11:
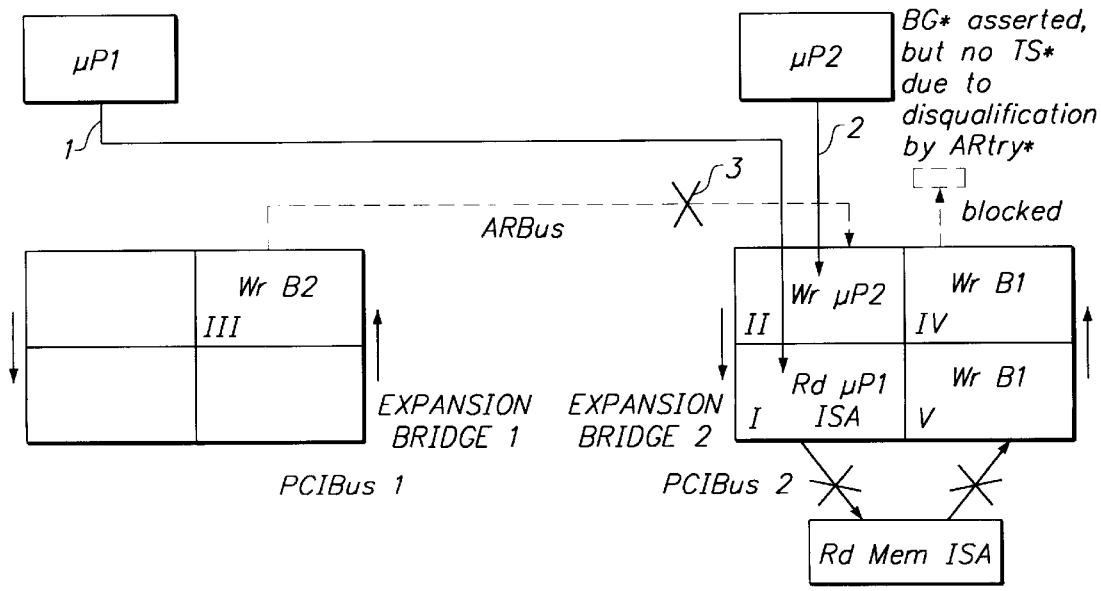
FIG. 11 illustrates a deadlock in which a Bus Grant signal and an Address Retry signal occur concurrently.

Referring to FIG. 11, deadlock may occur in the case of concurrent Bus Grant and Address Retry signals. A typical sequence of transactions is as follows:

1. Expansion Bridge 1 attempts a write to Expansion Bridge 2 but Expansion Bridge 2 buffers are full.
2. Expansion Bridge 2 has a write to Expansion Bridge 1 and received Bus Grant during Expansion Bridge 1 cycle.
3. Expansion Bridge 2 ARTRY*s Expansion Bridge 1 due to full buffers. As per ARBus specification, Expansion Bridge 2 ignores its Bus Grant and does not take the ARBus.
4. As per ARBus specification, following ARTRY* both Expansion Bridge 1 and Expansion Bridge 2 deassert their Bus Requests for one clock. Both re-assert Bus Requests. Expansion Bridge 1 wins. The foregoing sequence of transactions is repeated indefinitely.

Following ARBus protocol after an ARtry*, a master who has a Bus Grant ignores it. All masters must deassert their Bus Requests the clock following an ARtry*, and then re-assert them. In a fixed priority arbitration scheme, the higher priority master will win every time, and if it cannot complete its access, an ARBus livelock results. This is a Type-C LockUp, and is avoided by having the expansion bridge disregard the ARBus protocol, and take the address tenure if a Bus Grant occurs during an ARtry*. An expansion bridge can do this without adverse side-effects because it is not a snooping bus master.

Figure 12:
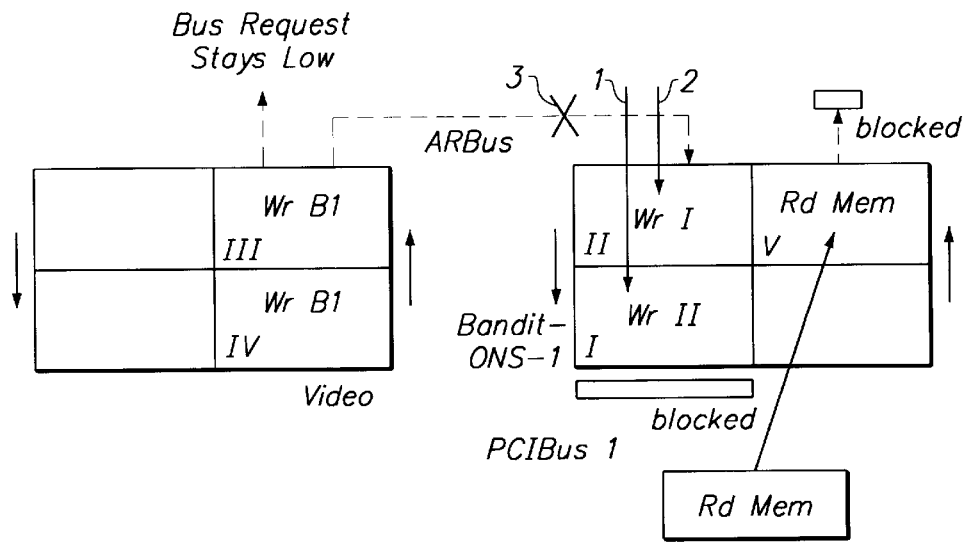
FIG. 12 illustrates a deadlock in which a Bus Request signal and an Address Retry signal occur concurrently.

Referring to FIG. 12, deadlock may occur in the case of concurrent Bus Request and Address Retry signals. A typical sequence of transactions is as follows:

1. Video attempts a write to Expansion Bridge 1 but Expansion Bridge 1 buffers are full;
2. Expansion Bridge 1 has its Bus Request asserted because it has a read of memory to perform, but Video, with multiple cycles to perform, keeps its Bus Request asserted.
3. Expansion Bridge 1 ARTRY*s Video due to full buffers. As per ARBus specification, Expansion Bridge 1 and Video deassert their bus requests the clock following ARTRY*.
4. Video and Expansion Bridge 1 reassert the bus requests. Since Video has a fixed higher priority than Expansion Bridge 1, it constantly gets Bus Grant. The foregoing sequence of transactions is repeated indefinitely.

Following ARBus protocol after an ARTRY*, all masters on the bus deassert their Bus Requests to give the Processor a guaranteed window being the only bus requestor. This guarantees that the Processor, who normally has lowest ARBus priority, acquires the bus next in order to complete a high priority transaction such as a Snoop Push. In this case, the ARBus protocol causes the lower priority expansion bridge to never receive a Bus Grant due to the higher priority Video requesting the ARBus to complete its access. Since the completion of the Video access is dependent on the expansion bridge freeing up some buffer space, and since the expansion bridge must get the ARBus to complete its access or receive an ARTRY* in order to free up PCI Bus 1 to free up buffer space for the Video write to come in, the expansion bridge effectively needs higher priority than Video this time. This is a Type-C LockUp, and is avoided by having an expansion bridge keep its Bus Request asserted the clock following an ARTRY* if it is the source of the ARTRY*. This is precisely the protocol the MP60X processor performs to effectively achieve a higher priority when necessary.

Figure 13:
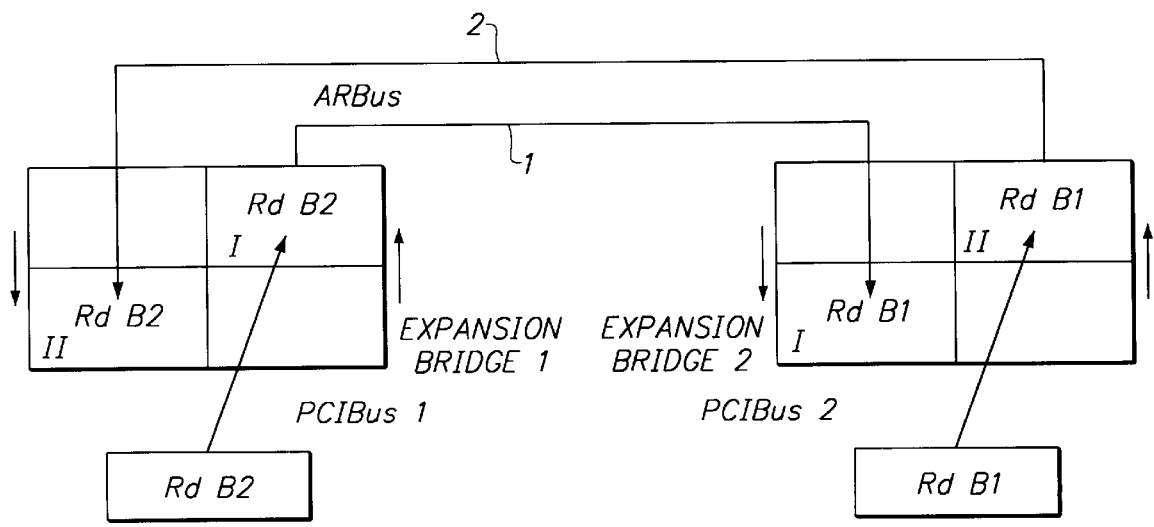
FIG. 13 illustrates a deadlock in which expansion bridges read each other concurrently.

Referring to FIG. 13, deadlock may occur in the case of expansion bridges reading each other concurrently. A typical sequence of transactions is as follows:

1. A Master Behind Expansion Bridge 1 reads a target behind Expansion Bridge 2 (Expansion Bridge 2 AAck*s) stalling PCI Bus 1. The read remains outstanding within Expansion Bridge 2.
2. A Master Behind Expansion Bridge 2 reads a target behind Expansion Bridge 1 (Expansion Bridge 1 AAck*s) stalling PCI Bus 2. The read remains outstanding within Expansion Bridge 1.

This is the most basic deadlock case. Each expansion bridge has a stalled bus, and yet each expansion bridge accepts the read from the opposite expansion bridge. Neither of the accepted reads can complete because the buses they are attempting to get onto are stalled. At least one of the buses must free itself for this basic deadlock to be avoided; one expansion bridge must not accept the read, but must ARTRY* the read attempt to it. This is a Type-A LockUp, and is avoided by having an expansion bridge disallow a read of its slave while it has an outstanding master read tenure (AAck* without ARTRY*). Once the data bus grant is received corresponding to the address tenure, then the transaction is guaranteed to complete and slave reads can be accepted.

Figure 14:
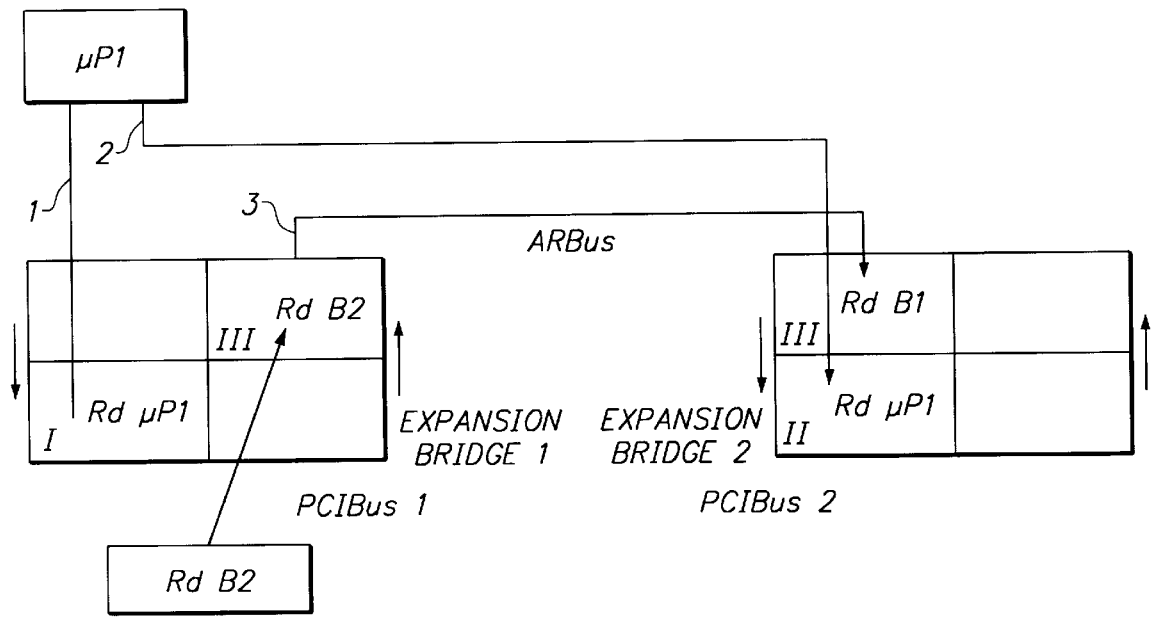
FIG. 14 illustrates a deadlock in which one master attempts to read both expansion bridges.

Referring to FIG. 14, deadlock may occur in the case of one master attempting to read both expansion bridges. A typical sequence of transactions is as follows:

1. PCI Bus 1 Master initiates read of target behind Expansion Bridge 2, and stalls PCI Bus 1.
2. Processor 1 reads target behind Expansion Bridge 1 (Expansion Bridge 1 AAck*s without ARTRY*).
3. Processor 1 reads target behind Expansion Bridge 2 (Expansion Bridge 2 AAck*s without ARTRY*).
4. PCI Bus 1 Master's read of target behind Expansion Bridge 2 occurs on ARBus (Expansion Bridge 2 AAck*s without ARTRY*).

Master Processor 1 has ordered itself: a) Read Expansion Bridge 1, b) Read Expansion Bridge 2. Slave Expansion Bridge 2 has ordered itself: a) Read by Processor 1, b) Read by Expansion Bridge 1. Expansion Bridge 1 has implied ordering due to stalled PCI Bus of: a) Read of Expansion Bridge 2, b) Read by Processor 1. In this scenario, all three devices involved have conflicting completion orders. Although Processor 1's read of the target behind Expansion Bridge 2 can complete on PCI Bus 2, it cannot complete on the ARBus until Processor 1's read of Expansion Bridge 1 has completed. Expansion Bridge 1's read of Expansion Bridge 2 must complete before Processor 1's read of Expansion Bridge 1 can complete. Since Expansion Bridge 2 is ordered to deliver the response to Processor 1's read before delivering the response to Expansion Bridge 1's read, the deadlock results. This is a Type-A LockUp, and is avoided by preventing one master from reading both an expansion bridges. This prevents the response ordering dependencies for the master.

Figure 15:
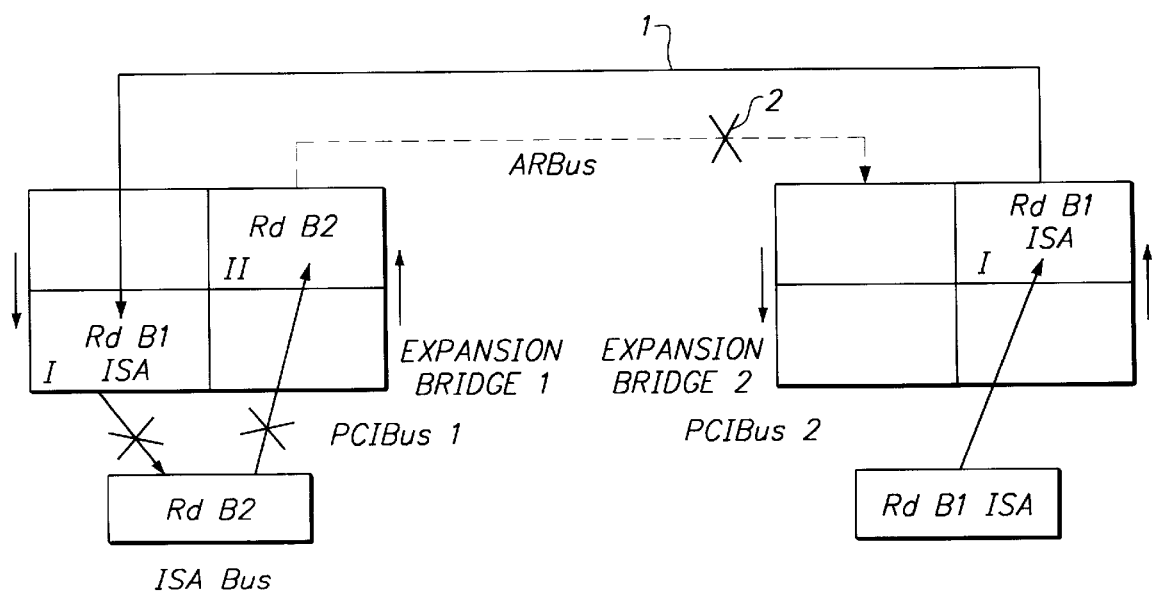
FIG. 15 illustrates a deadlock in which an ISA bus master reads a target behind an opposite expansion bridge.

Referring to FIG. 15, deadlock may occur in the case of an ISA bus master reading a target behind an opposite expansion bridge. A typical sequence of transactions is as follows:

1. PCI Bus 2 Master reads ISA target behind Expansion Bridge 1, stalling PCI Bus 2 (Expansion Bridge 1 AAck*s)

2. ISA Master on ISA initiates read of target behind Expansion Bridge 2. ISA Master cannot be backed off.
3. Expansion Bridge 1 forwards ISA Master's read to Expansion Bridge 2. Expansion Bridge 2 retries Expansion Bridge 1 because PCI Bus 2 Master read is outstanding. This occurs indefinitely.

The fact that the master behind Expansion Bridge 2 got its read AAck*ed by Expansion Bridge 1 on the ARBus prior to the ISA bus master behind Expansion Bridge 1, implies that Expansion Bridge 2's completion order is: 1) Complete read to ISA bus behind Expansion Bridge 1, 2) Accept incoming read from Expansion Bridge 1 (or whomever). However, the ISA bus has initiated an access and will retry all accesses to it until its read of the target behind Expansion Bridge 2 has completed. The ISA bus completion order is: 1) Complete read to target behind Expansion Bridge 2, 2) Accept incoming read from Expansion Bridge 2 (or whomever). These two masters have conflicting completion orders. Note that if PCI Bus 2 had not been stalled by its read and Expansion Bridge 2 could have accepted the read from Expansion Bridge 1, then all transactions would be able to complete. This is a Type-A (PCI Bus 2 stall) and Type-B LockUp (ISA bus block). The fix is to allow ISA bus master cards to communicate only with main memory or targets behind the same expansion bridge. For example, system software may remap accesses across the bridges to memory and complete transfers virtually.

Figure 16:
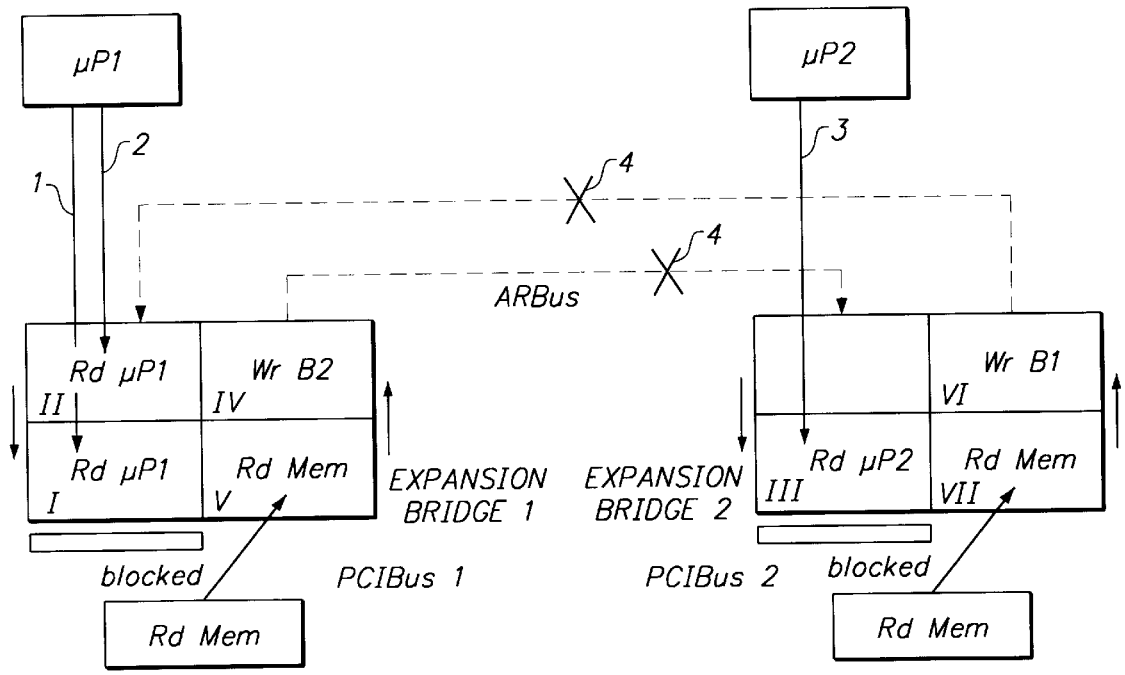
FIG. 16 illustrates a deadlock in which a PCI bus master read gets stuck behind a posted PCI bus master write.

Referring to FIG. 16, deadlock may occur when a PCI bus master read gets stuck behind a posted PCI bus master write. A typical sequence of transactions is as follows:
1. Three transactions: a) Processor 1 Reads Expansion Bridge 1, b) Processor 1 Reads Expansion Bridge 1, c) Processor 2 Reads Expansion Bridge 2
2. Meanwhile: a) Expansion Bridge 1 has a write transaction destined for Expansion Bridge 2, and a PCI Bus Master on PCI Bus 1 issues a read of memory, stalling PCI Bus 1, b) Expansion Bridge 2 has a write transaction destined for Expansion Bridge 1, and a PCI Bus Master on PCI Bus 2 issues a read of memory, stalling PCI Bus 2.

The normal means to get a PCI Bus Master read to free up the PCI Bus is to retry a transaction from the PCI bus when it cannot be serviced. Normally, the PCI Bus Master read would propagate to the ARBus, attempt its cycle on the ARBus, and either complete or get an ARTRY*. In either event, it frees up the bus. For a high-performance architecture, concurrent reads are desired at all times. The scenario on both PCI buses is that they are stalled with reads heading to memory, but there are write transactions to the opposite expansion bridge in each expansion bridge which cannot complete (because the transaction limit has been reached). Since neither expansion bridge's ARBus master write transactions can complete their address tenure, their respective PCI Bus Master read tenures cannot gain access to the ARBus to complete or receive an ARTRY*. In this instance the PCI buses will remain stalled indefinitely. This is a Type-A LockUp, and is avoided by having an expansion bridge immediately retry PCI Bus master reads if it has a PCI Bus master write transaction queued up in front of it that has not completed. This will ensure that the PCI Bus master read has access to the ARBus to complete the access or receive an ARTRY*.

Figure 17:
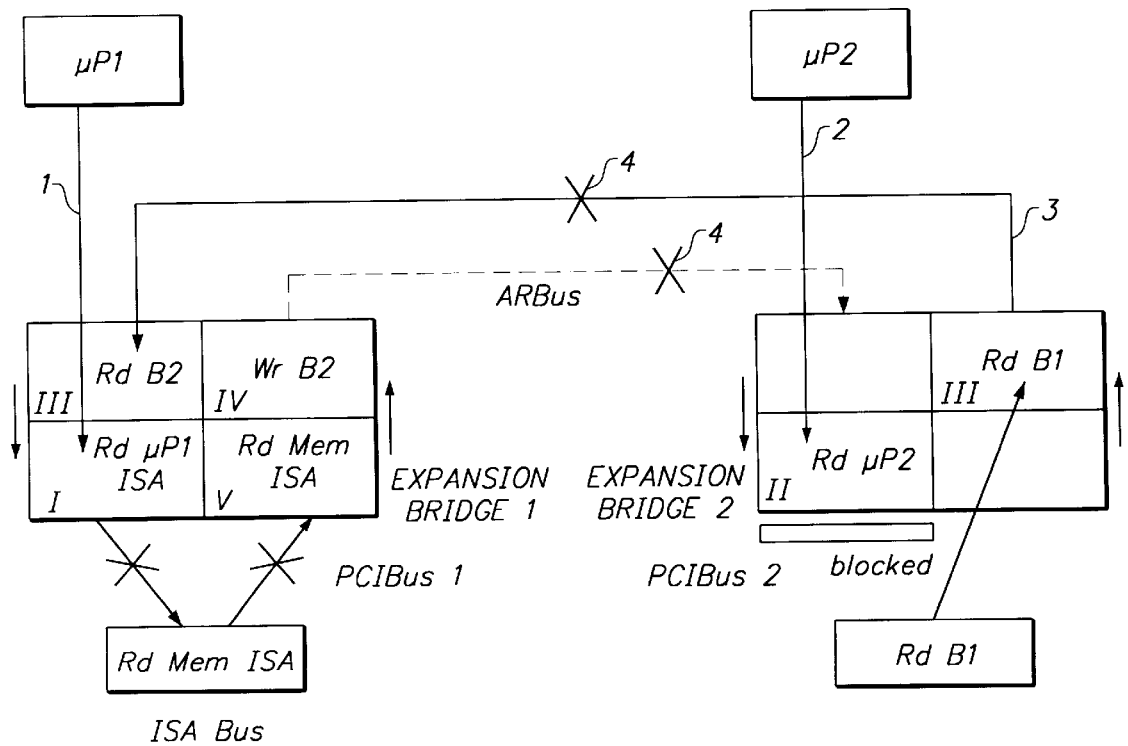
FIG. 17 illustrates a deadlock in which the ARBus transaction limit is hit, and accesses cannot complete.

Referring to FIG. 17, deadlock may occur when the ARBus transaction limit is hit, and accesses cannot complete. A typical sequence of transactions is as follows:
1. Three transactions: a) Processor 1 Reads ISA target behind Expansion Bridge 1, b) Processor 2 Reads target behind Expansion Bridge 2, c) Expansion Bridge 2 Reads target behind Expansion Bridge 1, stalling PCI Bus 2.
2. Meanwhile: a) Expansion Bridge 1 has a write transaction destined for Expansion Bridge 2, and b) an ISA Bus Master has initiated a read access of main memory on the ISA Bus. The ISA bus master cannot be backed off. This ISA bus master access blocks the Processor 1 Read from completing.

The fundamental problem with this scenario is that the transaction queue depths are limited to three transactions. If the depth were four, then the Expansion Bridge 1 write transaction destined for Expansion Bridge 2 could complete, allowing the ISA bus master read of main memory to complete, etc. Given that the transaction queue depths are limited to three transactions, the other two problems to note are that the PCI Bus Master on PCI Bus 2 has stalled its bus with the read of the target behind Expansion Bridge 1 and that the ISA bus master has stalled its ISA bus with the read of main memory. If either bus were not stalled, then either the Processor 2 read of the target behind Expansion Bridge 2 would complete, or the Processor 1 read of the ISA target would complete. This is a Type-A (PCI Bus 2 stall) and Type-B LockUp (ISA bus block). Since neither the PCI Bus 2 stall or the ISA bus block can be prevented, the deadlock is avoided by the ARBus arbiter to prevent Expansion Bridge 2 from reading Expansion Bridge 1 if Expansion Bridge 2 has an outstanding read. In general terms, if an expansion bridge-A has an outstanding ARBus Master's Slave Read, then the ARBus arbiter should prevent (ARTRY*) an expansion bridge-A from reading an expansion bridge-B until the outstanding read has completed.

Figure 18:
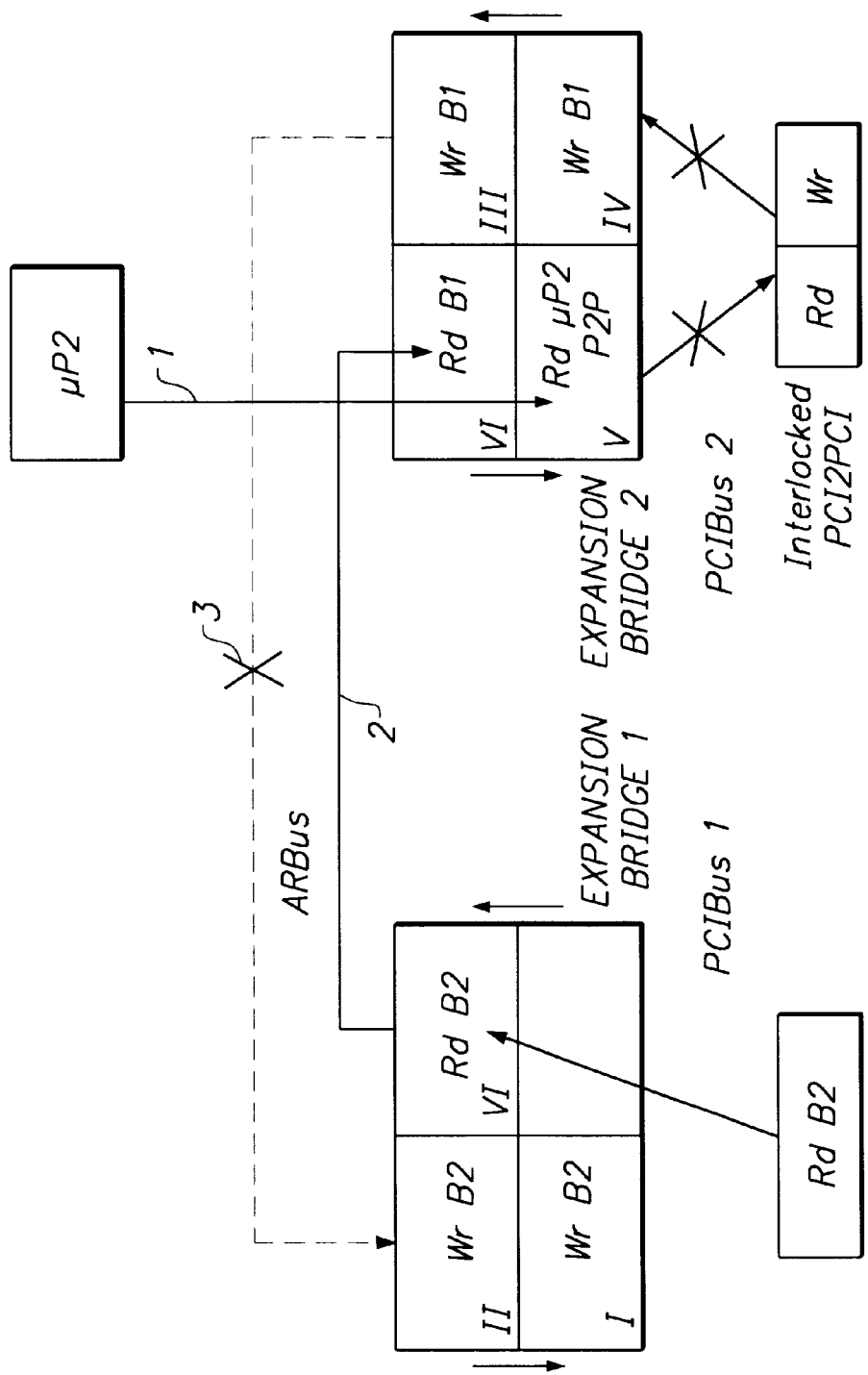
FIG. 18 illustrates a deadlock in which one expansion bridge, with an outstanding ARBus read, accepts a read from another expansion bridge.

Referring to FIG. 18, deadlock may occur when one expansion bridge, with an outstanding ARBus read, accepts a read from another expansion bridge. A typical sequence of transactions is as follows:
1. Expansion Bridge 1 accepts two ARBus to PCI Bus 1 writes. Meanwhile, a PCI Bus Master on PCI Bus 1 has initiated a read access from a target behind Expansion Bridge 2.
2. Expansion Bridge 2 accepts a read from Processor 2 to the PCI2PCI bridge, followed by a read from Expansion Bridge 1. Meanwhile, Expansion Bridge 2 also accepts two PCI Bus to Expansion Bridge 1 write cycles.
3. The Processor 2 read of the PCI2PCI bridge causes the bridge to attempt to flush posted write data to main memory. Since all buffers are filled in the direction of PCI Bus 2 to PCI Bus 1, and PCI Bus 1 is stalled, the PCI2PCI bridge cannot flush its data.

The problem with this scenario is that the two PCI buses have conflicting completion orders. Since Expansion Bridge 2 AAck*ed Expansion Bridge 1's read, PCI Bus 1 has committed to completing the read before allowing any other accesses to occur, thereby stalling the PCI Bus. The Processor 2 read of the PCI2PCI bridge has kicked off the interlocking behavior of the bridge. The PCI2PCI bridge will not service the read until it has completed its writes. Unfortunately, to complete its write, an access must occur on PCI Bus 1 to free up some buffer space. PCI Bus 2 won't service the read until it executes the write, and PCI Bus 1 won't service the write until it completes the read. This is a Type-A (PCI Bus 1 stall) and Type-B LockUp (PCI2PCI bridge block). Since neither the PCI Bus 1 stall or the PCI2PCI bridge block can be prevented, the fix is for the ARBus arbiter to prevent Expansion Bridge 1 from reading Expansion Bridge 2 if Expansion Bridge 2 has an outstanding read. In general terms, if an expansion bridge has an outstanding ARBus master's Slave Read, then the ARBus arbiter should prevent (ARTRY*) another expansion bridge from reading that expansion bridge until the outstanding read has completed.

Summary of Deadlock Avoidance Rules

The following summary is a compilation of the foregoing rules. Items below in italic text are deadlock avoidance rules for which an expansion bridge is responsible, and items below in plain text are deadlock avoidance rules for which the ARBus arbiter or processor bus arbiter is responsible.

Deadlock Avoidance Rules for Single Expansion Bridge, Split Bus, Fixed Priority, Ordered Masters and Slaves A1. The ARBus arbiter must prevent an ARBus master from reading main memory (via ARTRY*) if that master has an outstanding read of an expansion bridge.

A2. The ARBus arbiter must prevent an access by an ARBus master that would cause a second level cache hit or allocate (via ARTRY*) if that master has an outstanding read of an expansion bridge.

A3. The ARBus arbiter must prevent a snooping ARBus master from writing to an expansion bridge if the master has an outstanding read of an expansion bridge to allow for required Snoop Push write transactions.

Deadlock Avoidance Rules for Multiple Expansion Bridges, Split Bus, Fixed Priority, Ordered Masters and Slaves B1. *An expansion bridge must disregard ARBus protocol and take the address tenure if a Bus Grant occurs concurrent with an ARtry*.*

B2. *An expansion bridge must disregard ARBus protocol and keep its Bus Request asserted the clock following an ARTRY* if it is the source of the ARTRY*.*

B3. *An expansion bridge must disallow a read of its slave while it has an outstanding master read transaction and its corresponding data tenure has not begun.*

B4. The ARBus arbiter must prevent one master from reading both expansion bridges.

B5. ISA bus master cards must not read targets behind the opposite bridge. Software must restrict target accesses from ISA to the same bridge or main memory.

B6. *An expansion bridge must retry PCI Bus master reads if it has a PCI Bus master write transaction queued up in front of it that has not completed.*

B7. If an expansion bridge has an outstanding ARBus master's Slave Read, the ARBus arbiter must prevent (ARTRY*) that expansion bridge from reading another expansion bridge until the read completes.

B8. If an expansion bridge has an outstanding ARBus master's Slave Read, the ARBus arbiter must prevent (ARTRY*) another expansion bridge from reading that expansion bridge until the read completes.

Implementation of Deadlock Avoidance Rules

As noted above, some of the deadlock avoidance rules are implemented in the expansion bridge itself. Others of the deadlock avoidance rules are implemented in the system arbiter. In either case, the general technique employed is to detect a deadlock hazard, a condition which, if a single further "deadlocking" transaction were accepted, would result in deadlock and, if that transaction is requested, refusing to accept it by issuing a retry signal.

Referring again to FIG. 6, a block 613 monitors the state of the master queues 601 to detect a deadlock hazard, and monitors the BG and SACK vectors to detect a deadlocking transaction. When such a transaction is requested, an ARTRY signal is generated, causing the transaction to be backed off instead of being accepted and queued.

Each master queue locally generates two signals, a ValidBr1Rd signal, indicating that the master has a read to Expansion Bridge 1 pending, and a ValidBr2Rd signal, indicating that the master has a read to Expansion Bridge 2 pending. These signals are bussed to the block 613 instead of actual queue entries.

From the foregoing signals, the block 613 detects deadlock hazards. Also input to the block 613 are the BG vector and the SACK vector, which together indicate the master/slave pair for a requested transaction. From the latter signals, the block 613 detects deadlocking transactions and in response generates a ARTRY signal. Generation of the ARTRY signal may be performed in accordance with a routine set forth in Appendix C.

Referring again to FIG. 7, in the case of the expansion bridge 700, deadlock avoidance is implemented in an ARBus control block 710 and in a PCIBus control block 720. In particular, an Address Master state machine [AMst601] causes the expansion bridge 700 to disregard the ARBus protocol and take address tenure if a Bus GRant occurs concurrent with an ARTRY signal. Likewise, the Address Master state machine [AMst601] causes the expansion bridge 700 to disregard the ARBus protocol and keep its Bus Request asserted the clock following an ARTRY if it is the source of the ARTRY.

An Address Slave state machine and a PCI Master state machine each implement a further deadlock avoidance rule in similar manner as described previously in relation to the system arbiter. That is, a deadlock hazard is detected, during which if a deadlocking transaction is detected, that transaction is refused. In particular, the Address Slave state machine disallows a read of its slave while it has an outstanding master read transaction and its corresponding data tenure has not begun. The PCI Master state machine retries PCI Bus master reads if it has a PCI Bus master write transaction queued up in front of it that has not completed.

Use of the described deadlock avoidance techniques enables a high-performance split-transaction system bus to be interfaced to a single-envelope expansion bus without compromising system reliability. Rather than the characteristics of the expansion bus limiting the performance of the system bus, performance of the system bus may be separately optimized. As a result, overall system performance is greatly improved.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

APPENDIX A

Address Bus Arbitration Algorithm

```
function [0:4] CalcBG;
    input [0:4] BR;
    input [0:4] OldBG;
    input      ParkMode;
    input [0:2] ParkVal;
    if (&BR) begin
        if (!ParkMode) CalcBG = OldBG;
        else case (ParkVal)    // synopsys full_case parallel_case
            2'b000: CalcBG = 5'b01111;    // VIDEO
            2'b001: CalcBG = 5'b10111;    // EXPANSION 1
            2'b010: CalcBG = 5'b11011;    // EXPANSION 2
            2'b011: CalcBG = 5'b11101;    // CPU0
            2'b100: CalcBG = 5'b11110;    // CPU1
        endcase
    end else casex (BR)       // synopsys full_case parallel_case
        5'b0xxxx: CalcBG = 5'b01111;    // VIDEO
        5'b10xxx: CalcBG = 5'b10111;    // EXPANSION 1
        5'b110xx: CalcBG = 5'b11011;    // EXPANSION 2
        5'b1110x: CalcBG = 5'b11101;    // CPU0
        5'b11110: CalcBG = 5'b11110;    // CPU1
    endcase
endfunction
```

APPENDIX B

Data Bus Arbitration Algorithm
(a pseudo-code summary is more appropriate here)
- if at least one master queue is non-empty
  - select the highest priority non-empty master queue, based upon the following priority encoding:
    ```
    0:   VIDEO         (Highest)
    1:   EXPANSION 1
    1:   EXPANSION 2
    2:   CPU0
    3:   CPU1          (Lowest)
    ```
  - upon examining the selected master queue to see which slave is selected in the front entry, look at the front entry of the associated slave queue to see if it points back to the selected master. If it does, a master/slave match occurs.
  - if a master/slave match has occurred, grant the data bus to the selected master (via DBG) and slave (via SSD). Otherwise, remain idle.
- otherwise remain idle

APPENDIX C

Retry Generation

The first term, L2Retry, will kill a transaction that the cache cares about if that master already has an outstanding transaction to an expansion bridge. CPU writes to memory are an exception to this rule, since we'll use DBWO.

The second term, TransFullRetry, kills an access when we already have the maximum number of outstanding transactions (3).

The third term, ExRdRetry, is an OR of a vector showing an AAck of a master that has an outstanding expansion bridge read. This transaction must be to a non-bridge slave, and only writes to memory are excepted.

The fourth term, ExCrossRdRetry, will kill an expansion bridge's master read of the other expansion bridge if the expansion bridge master already has a slave read outstanding to it, Or if the expansion bridge slave already has an outstanding read.

The fifth term, ExWrRetry, will kill a CPU write to an expansion bridge that has an outstanding slave read. This is so that any snoop push writes won't get backed up behind the write the the expansion bridge (which, in turn, could be blocked by a read on PCI, etc . . . )

The last term incorporates all of the retry components into DoARtry_. ARtry is DoARtry delayed by one register delay.

The following Table maps the deadlock rules identified in the DETAILED DESCRIPTION to the deadlock cases below:

| Deadlock Rule (Description) | Verilog Deadlock case |
|---|---|
| A1 | ExRdRetry |
| A2 | L2Retry |
| A3 | ExWrRetry |
| B4 | ExRdRetry |
| B7 | ExCrossRdRetry (1,4) |
| B8 | ExCrossRdRetry (2,3) |

```
Code
assign #`AD L2Retry        = (!sackIn_[0] || !sackIn_[1]) && L2Cares &&
                             ! (CpuMemWr && !DisableDBWO && ! SnoopQFull) &&
                             | (~MasNum & ValidToEx);
assign #`AD TransFullRetry = TransFull && DatSack && !DataDone;
assign #`AD ExRdRetry      = (!aackIn_ || !aackOut_) &&
                             ! (CpuMemWr && !DisableDBWO && !SnoopQFull) &&
                             ( (qSackIn_[4] && | (~MasNum & ValidEx1Rd))
                             || (qSackIn_[5] && | (~MasNum & ValidEx2Rd)) );
assign #`AD ExCrossRdRetry = oldTT1 &&
                             (
                               (Ex1HasSlvRd && !MasNum[1] && !qSackIn_[5]) // B1 —> B2 (1)
                             || (Ex1HasSlvRd && !MasNum[2] && !qSackIn_[4]) // B2 —> B1 (2)
                             || (Ex2HasSlvRd && !MasNum[1] && !qSackIn_[5]) // B1 —> B2 (3)
                             || (Ex2HasSlvRd && !MasNum[2] && !qSackIn_[4]) // B2 —> B1 (4)
                             );
assign #`AD ExWrRetry      = !oldTT1 && (!MasNum[3] || !MasNum[4]) &&
                             (  (Ex1HasSlvRd && !qSackIn_[4])
                             || (Ex2HasSlvRd && !qSackIn_[5])
                             );
```

-continued

```
assign #"AD DoArtry__    = ! ( oldTT3 &&
                           (    L2Retry
                           ||   TransFullRetry
                           ||   ExRdRetry
                           ||   ExCrossRdRetry
                           ||   ExWrRetry
                           )
                         );
```

What is claimed is:

1. A method of avoiding system deadlock in a computer system having a split-transaction bus and a single-envelope bus bridged by a bus bridge, said split-transaction bus and said single-envelope bus each having at least one master device and one slave device connected thereto, said method comprising the steps of:

monitoring transactions begun on said split-transaction bus;

prior to the time a transaction is first requested, determining based on deadlock considerations whether to accept the transaction for eventual execution or to refuse the transaction, including:

detecting when one or more accepted transactions would, if a predetermined further transaction were to begin, result in deadlock; and refusing to accept said predetermined further transaction by sending a retry signal to a requester.

2. The method of claim 1, wherein said at least one slave connected to said split-transaction bus is a main memory of said computer system.

3. The method of claim 2, wherein said transaction that would result in deadlock is a read by said at least one master connected to said split-transaction bus of said at least one slave connected to said single-envelope bus, and wherein said further predetermined transaction is a read by said at least one master connected to said split-transaction bus of said main memory.

4. The method of claim 1, wherein said at least one slave connected to said split-transaction bus is a level-two cache memory of said computer system.

5. The method of claim 4, wherein said transaction that would result in deadlock is a read by said at least one master connected to said split-transaction bus of said at least one slave connected to said single-envelope bus, and wherein said further predetermined transaction is an access by said at least one master connected to said split-transaction bus that would cause a hit or allocate to occur in said level-two cache memory.

6. The method of claim 4, wherein said at least one master connected to said split-transaction bus is a snooping master that monitors address on said split-transaction bus in order to maintain coherence of said level-two cache memory.

7. The method of claim 6, wherein said transaction that would result in deadlock is a read by said snooping master through said bus bridge, and wherein said further predetermined transaction is a write by said snooping master through said bus bridge.

8. The method of claim 1, wherein said computer system has a further single-envelope bus bridged to said split-transaction bus by a bus bridge, said further single-envelope bus having at least one master device and one slave device connected thereto.

9. The method of claim 8, wherein said transaction that would result in deadlock is a read by said at least one master connected to said split-transaction bus through one of said bus bridge and said further bus bridge, and wherein said further predetermined transaction is a read by said at least one master connected to said split-transaction bus through a different one of said bus bridge and said further bus bridge.

10. The method of claim 8, wherein said transaction that would result in deadlock is a read by said at least one master connected to said split-transaction bus through one of said bus bridge and said further bus bridge, and wherein said further predetermined transaction is a read by said one of said bus bridge and said further bus bridge through a different one of said bus bridge and said further bus bridge.

11. The method of claim 8, wherein said transaction that would result in deadlock is a read by said at least one master connected to said split-transaction bus through one of said bus bridge and said further bus bridge, and wherein said further predetermined transaction is a read by a different one of said bus bridge and said further bus bridge through said one of said bus bridge and said further bus bridge.

12. The method of claim 1, wherein said step of refusing to accept comprises issuing a retry signal in response to a request for said predetermined further transaction.

13. A computer system comprising:

a split-transaction bus;

a single-envelope bus;

a bus bridge bridging said split-transaction bus and said single-envelope bus;

means for monitoring transactions begun on said split-transaction bus;

means for, prior to the time a transaction is first requested, determining based on deadlock considerations whether to accept the transaction for eventual execution or to refuse the transaction, including:

means for detecting when one or more accepted transactions would, if a predetermined further transaction were to begin, result in deadlock; and means for issuing a retry signal in response to a request for said predetermined further transaction.

14. The apparatus of claim 13, further comprising:

at least one master device and at least one slave device connected to each of said split-transaction bus and said single-envelope bus;

wherein said master device and said slave device are ordered.

15. A method of avoiding system deadlock in a computer system having a split-transaction bus and a single-envelope bus bridged by a bus bridge, comprising the steps of:

detecting within said bus bridge when a state of said split-transaction bus would, if a protocol of said split-transaction bus were adhered to, result in deadlock; and said bus bridge driving on( or more signals on said split-transaction bus in disregard of said protocol of said split-transaction bus, thereby avoiding deadlock.

16. The method of claim 15, wherein said state of said split-transaction bus that would, if a protocol of said split-transaction bus were adhered to, result in deadlock is the occurrence of a Bus Grant signal to said bus bridge on said split-transaction bus concurrently with the occurrence of a Retry signal from said bus bridge on said split-transaction bus, wherein said driving step comprises said bus bridge driving an address on said split-transaction bus.

17. The method of claim 15, wherein said state of said split-transaction bus that would, if a protocol of said split-transaction bus were adhered to, result in deadlock is the occurrence of a Bus Request signal from said bus bridge on said split-transaction bus concurrently with the occurrence of a Retry signal from said bus bridge on said split-transaction bus, wherein said driving step comprises said bus bridge driving said Bus Request on raid split-transaction bus during a cycle following the occurrence of said Retry signal.

18. A computer system comprising:

a split-transaction bus a single-envelope bus;

a bus bridge bridging said split-transaction bus and said single-envelope bus;

means within said bus bridge for detecting when a state of said split-transaction bus would, if a protocol of said split-transaction bus were adhered to, result in deadlock; and means within said bus bridge for driving one or more signals on said split-transaction bus in disregard of said protocol of said split-transaction bus, thereby avoiding deadlock.

19. The apparatus of claim 18, further comprising:

a further single-envelope bus; and a further bus bridge bridging said split-transaction bus and said further single-envelope bus.

20. The apparatus of claim 15, further comprising:

at least one master device and at least one slave device connected to each of said split-transaction bus and said single-envelope bus;

wherein said master device and said slave device are ordered.

21. A method of avoiding system deadlock in a computer system having a split-transaction bus and a single-envelope bus bridged by a bus bridge, comprising the steps of:

monitoring transactions accepted within said bus bridge;

prior to the time a transaction is first requested, determining based on deadlock considerations whether to accept the transaction for eventual execution or to refuse the transaction, including:

detecting when one or more accepted transactions would, if a predetermined further transaction were to begin, result in deadlock; and refusing to accept said predetermined further transaction by sending a retry signal to a requester.

22. The method of claim 21, wherein said step of refusing to accept comprises issuing a retry signal in response to a request for said predetermined further transaction.

23. A computer system comprising:

a split-transaction bus;

a single-envelope bus;

a bus bridge bridging said split-transaction bus and said single-envelope bus;

means for, prior to the time a transaction is first requested, determining based on deadlock considerations whether to accept the transaction for eventual execution or to refuse the transaction, including:

means within said bus bridge for monitoring transactions accepted within said bus bridge, for detecting when a transaction would, if a predetermined further transaction were to begin, result in deadlock, and for refusing to accept said predetermined further transaction by sending a retry signal to a requester.

24. The apparatus of claim 23, further comprising:

a further single-envelope bus; and a further bus bridge bridging said split-transaction bus and said further single-envelope bus.

25. The apparatus of claim 23, further comprising:

at least one master device and at least one slave device connected to each of said split-transaction bus and said single-envelope bus;

wherein said master device and said slave device are ordered.

* * * * *